United States Patent
Sarkar et al.

(10) Patent No.: US 12,276,287 B2
(45) Date of Patent: Apr. 15, 2025

(54) LIQUID HYDROGEN PUMP AND METHODS

(71) Applicant: Eaton Intelligent Power Limited, Dublin (IE)

(72) Inventors: Subrata Sarkar, Maharashtra (IN); Abhijit Borawake, Maharashtra (IN); Steven Charles Riley, Grayshott (GB); Andrew John Masson, Southampton (GB); Sahil Kartik Patel, Southampton (GB); Amit Kalmegh, Pune Yewalewadi (IN)

(73) Assignee: Eaton Intelligent Power Limited, Dublin (IE)

( * ) Notice: Subject to any disclaimer, the term of this patent is extended or adjusted under 35 U.S.C. 154(b) by 147 days.

(21) Appl. No.: 18/351,449

(22) Filed: Jul. 12, 2023

(65) Prior Publication Data
US 2024/0018974 A1    Jan. 18, 2024

(30) Foreign Application Priority Data
Jul. 14, 2022 (IN) .............................. 202211040491

(51) Int. Cl.
| | |
|---|---|
| F04D 29/60 | (2006.01) |
| F04D 13/00 | (2006.01) |
| F04D 13/06 | (2006.01) |
| F04D 29/00 | (2006.01) |
| F04D 29/40 | (2006.01) |

(52) U.S. Cl.
CPC .......... *F04D 29/605* (2013.01); *F04D 13/00* (2013.01); *F04D 13/06* (2013.01); *F04D 29/00* (2013.01); *F04D 29/406* (2013.01); *F04D 29/60* (2013.01); *F04D 13/0606* (2013.01)

(58) Field of Classification Search
CPC ..... F04D 29/406; F04D 29/605; F04D 29/606
See application file for complete search history.

(56) References Cited

U.S. PATENT DOCUMENTS 3,539,272 A * 11/1970 Howard ............... F02M 37/103
415/201

FOREIGN PATENT DOCUMENTS

| EP | 3 069 004 B1 | 2/2018 |
|---|---|---|
| GB | 940510 A | 10/1963 |

OTHER PUBLICATIONS

Brewer, G.Daniel et al., "Study of Fuel Systems for LH2-Fueled Subsonic Transport Aircraft, Final Report—vol. 1", National Aeronautics and Space Administration, NASA-SR-145369, 19780023142. pdf (NASA.gov), Jul. 1978, 201 pages.
Extended European Search Report for Application No. 23185447.2 mailed Dec. 4, 2023.

* cited by examiner

*Primary Examiner* — Brian O Peters
(74) *Attorney, Agent, or Firm* — Merchant and Gould, PC

(57) ABSTRACT

One or more boost pumps for a liquid hydrogen fuel system are disposed within the fuel tank and fully flooded. An electrical connector of each boost pump is sealed from the fuel tank and accessible from an exterior of the fuel tank while the boost pump is installed. Each boost pump can be independently replaced using a toolbox. Each boost pump is purged of fuel before being replaced by introducing a gas at a center region of the boost pump. The toolbox and new boost pump are purged prior to removal of the old boost pump. Each boost pump can be formed from modular components.

8 Claims, 18 Drawing Sheets

LIQUID HYDROGEN PUMP AND METHODS

CROSS-REFERENCE TO RELATED APPLICATION(S)

This application claims the benefit of Indian Provisional Application Serial No. 202211040491, filed Jul. 14, 2022, the disclosure of which is hereby incorporated by reference in its entirety.

BACKGROUND

The use of hydrogen as a fuel source for aircraft is considered one of the most transformative technologies for future aircraft designs. The use of hydrogen can potentially reduce green-house gas emissions considerably as compared to fossil fuel-based aircraft. Although hydrogen has an energy-density-per-unit mass that is three times higher than traditional jet fuel, hydrogen technology has several challenges (e.g., production, transport, distribution, aircraft storage, etc.). For aircraft propulsion as fuel, hydrogen has the possibility of being used in three ways which include high-pressure gaseous hydrogen, liquid hydrogen at atmospheric pressure, and supercritical liquid hydrogen at more than 13 bar pressure. However, hydrogen tank weight will be beyond an acceptable limit for the high-pressure gaseous hydrogen and supercritical fluid. Safety also presents an issue for handle high-pressure gaseous hydrogen and supercritical fluid during ground refueling. Thus, slightly pressurized liquid hydrogen is best suitable for aviation applications such as commercial aviation applications.

SUMMARY

Aspects of the present disclosure relate to a liquid hydrogen boost pump for supplying liquid hydrogen (LH2) from a fuel tank to an engine fuel system pump of a LH2 fuel system. In certain examples, the LH2 is pressurized. An example system may include a fuel tank, one or more boost pumps, and an engine fuel pump. LH2 may be stored at cryogenic temperature in the fuel tank. The LH2 may be pumped using the boost pumps to the engine fuel pump of an engine fuel system. In certain examples, the LH2 also is pumped to a hydrogen fuel cell for power generation at an auxiliary power unit (APU).

One aspect of the present disclosure relates to a modular design of a liquid hydrogen boost pump adapted to reduce boost pump installation and replacement time and cost. Another aspect of the present disclosure relates to methods for installing a liquid hydrogen boost pump (e.g., a boost pump for supplying liquid hydrogen to an aircraft engine fuel system pump) and pump features that facilitate the installation process of the boost pump. A further aspect relates to a process of replacing the liquid hydrogen boost pump without draining the fuel tank of the aircraft. Still another aspect relates to the design of pump changing tool which ensures the technician's safety during pump replacement and prevents ice formation inside the pump cavity and the escape of hydrogen to the atmosphere.

A variety of additional aspects will be set forth in the description that follows. The aspects can relate to individual features and to combinations of features. It is to be understood that both the forgoing general description and the following detailed description are exemplary and explanatory only and are not restrictive of the broad concepts upon which the examples disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Figure 1:
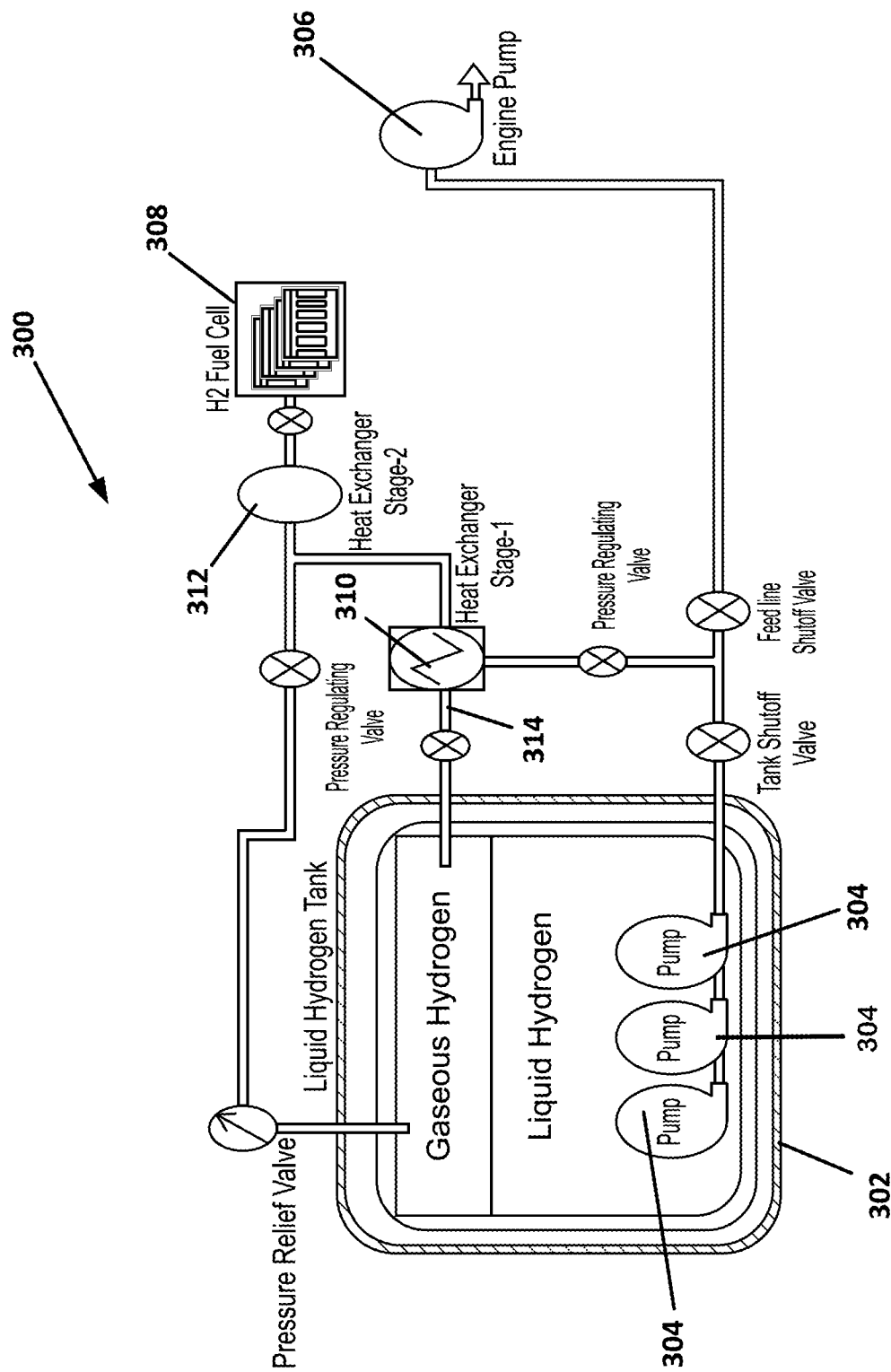
FIG. 1 is a schematic diagram of a hydrogen fuel system in accordance with the principles of the present disclosure, according to an example.

Aspects of the present disclosure relate to a liquid hydrogen boost pump for supplying liquid hydrogen (LH2) from a fuel tank to an engine fuel system pump of a LH2 fuel system. In certain examples, the LH2 is pressurized. In certain examples, the boost pump also may supply the LH2 to a hydrogen fuel cell. FIG. 1 shows a simplified hydrogen fuel system 300 including a fuel tank 302, boost pumps 304, and an engine fuel pump 306. LH2 is stored at cryogenic temperature in the fuel tank 302. The LH2 is pumped using the boost pumps 304 to the engine fuel pump 306 of an engine fuel system. In certain examples, the LH2 also is pumped to a hydrogen fuel cell 308 for power generation at an auxiliary power unit (APU). An example LH2 fuel system is shown and described in co-pending U.S. application Ser. No. 18/305,030, filed Apr. 21, 2023, and titled "Hydrogen Fuel System for Aircraft," the disclosure of which is hereby incorporated herein by reference in its entirety.

Three boost pumps 304 are depicted. In other examples, a greater or lesser number of boost pumps 304 could be utilized. During ground operation, only one of the boost pumps 304 operates to feed the fuel cell 308 for power generation of the APU. For take-off and other operations, two of the boost pumps 304 can continuously operate. The third boost pump 304 is redundant. The liquid hydrogen fuel transferred to the fuel cell 308 is first transformed into gas, and the temperature is raised using heat exchangers 310, 312. Part of the gaseous hydrogen (GH2) from the heat exchangers 310, 312 also could be used for tank pressurization of the LH2 fuel tank 302 (for example, via pressurization line 314). The LH2 pumped to the engine fuel system is pressurized using the engine fuel pump 306 and can be passed through a heat exchanger (e.g., one or both of the heat exchangers 310, 312 or another separate heat exchanger) before entering an engine combustion zone. If one of the operating boost pumps 304 fails, the third pump (i.e., the redundant pump) automatically turns on.

FIG. 1 is a schematic diagram of an example hydrogen fuel system. As depicted at FIG. 1, the three boost pumps 304 are located inside of the LH2 tank 302. In an alternative example, the boost pumps 304 also can be placed outside the LH2 tank 302 in a vacuum-insulated compartment to reduce the heat transfer and ice build-up. However, there are several advantages of the LH2 boost pumps 304 being installed inside the tank 302, including: a) the pumps 304 will always remain in the LH2 at the cryogenic condition, eliminating thermal cycling issues; b) all the components will remain at the same temperature, so thermal differential contraction will be minimal; c) the probability of air inside the fuel tank will be minimized because the LH2 tank 302 is pressurized, thus, ignition risk will also be minimized; and d) external leakage from the pumps will be less severe.

Each tank 302 in a hydrogen-fueled aircraft may preferably include at least three boost pumps 304 to maintain the aircraft's safety in the event of failure of a single pump 304, however, greater or fewer than three pumps 304 may be included in some examples. Jet-fueled aircraft can take off and climb to cruise altitudes with boost pumps inoperative most of the time, but a hydrogen-fueled aircraft engine will flame out if the boost pumps 304 fail, resulting in vaporization in the fuel line and subsequent pressure loss. In addition, aircraft operators are reluctant to ground an aircraft if one boost pump 304 in its fuel tank fails. Also, all intermediate stops of a flight may not be equipped or convenient for changing a cryogenically cooled pump 304. Hence, the boost pump system preferably includes redundancy which mitigates the risk of loss of thrust for any engine in the event of pump 304 failure immediately after take-off. One tank supplies each engine with two boost pumps 304 continuously operating during take-off and initial climb.

In certain examples, the pumps 304 are centrifugal pumps which are advantageous for LH2 aircraft application due to the hydrogen's large volume flow requirement and low viscosity. Other types of pumps may be used.

Figure 2A:
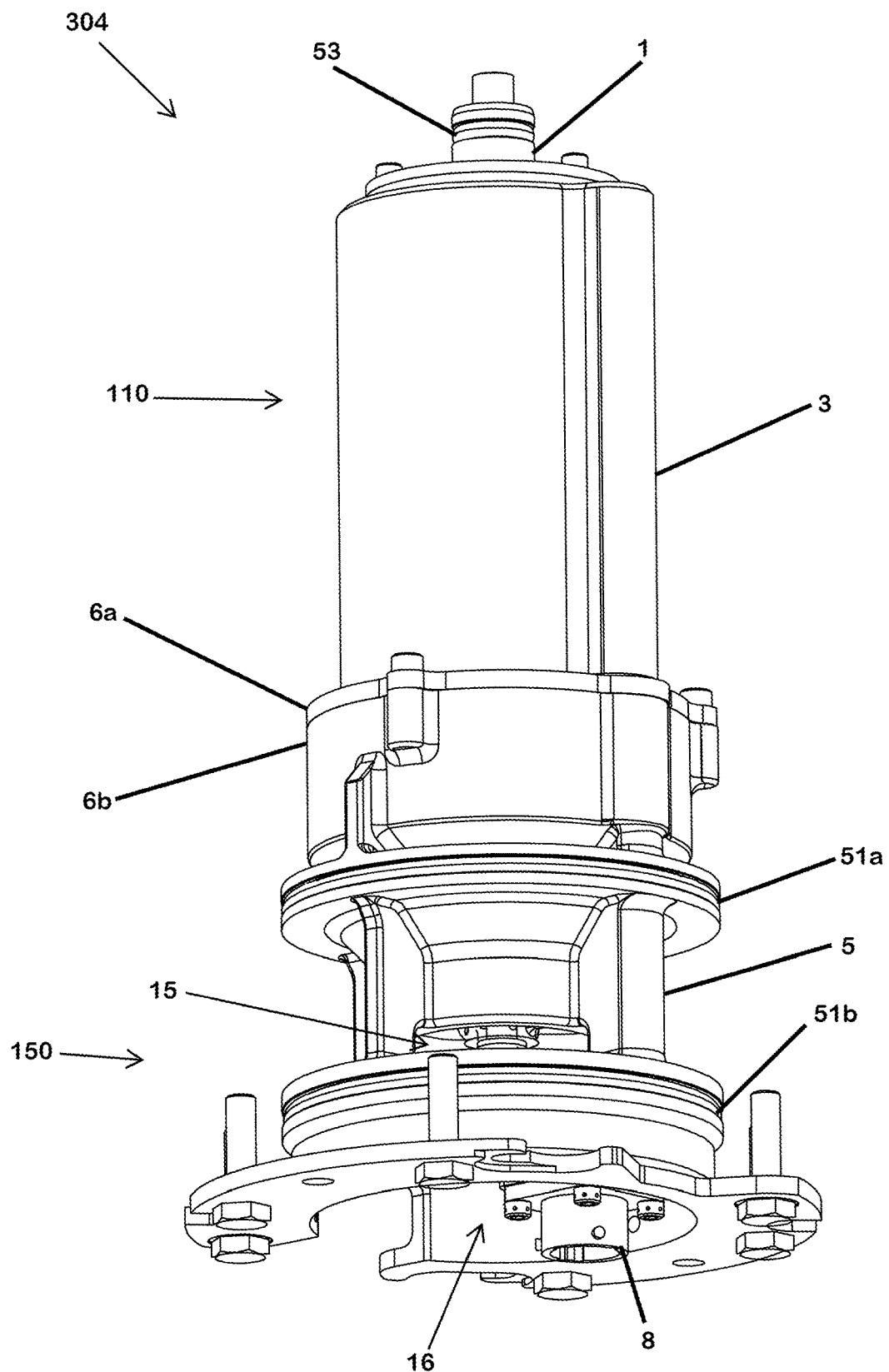
FIG. 2A is a perspective view of an example boost pump according to an example.
Figure 2B:
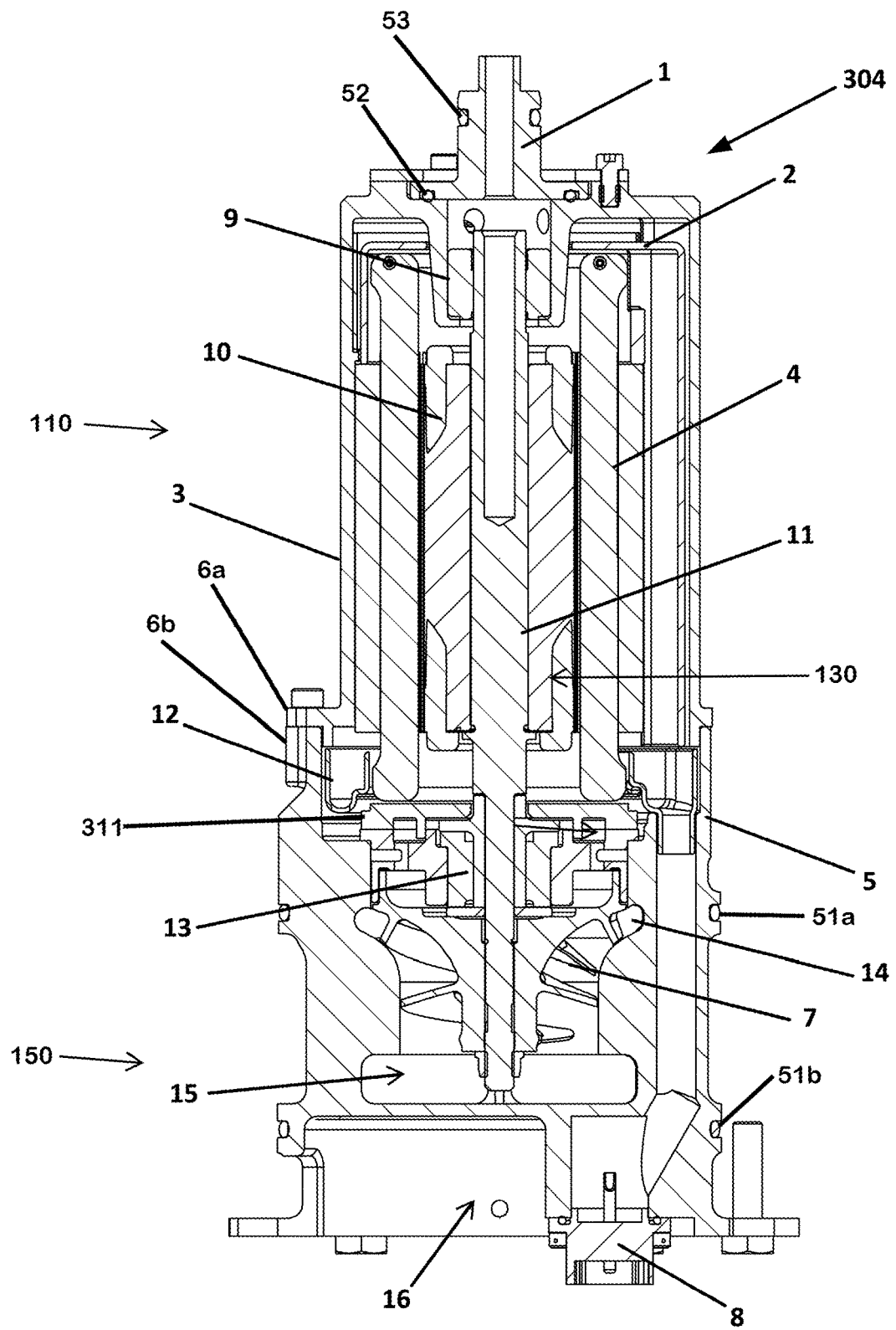
FIG. 2B is a cross-sectional view of the boost pump of FIG. 2A, according to an example.

FIG. 2A is a perspective view of an example LH2 boost pump 304, and FIG. 2B is a cross-sectional view of the LH2 boost pump 304. FIGS. 2A and 2B are described concurrently and not all components described are visible in both FIG. 2A and FIG. 2B. The depicted pump 304 includes three modules that assemble together to form the pump 304. The modules include an upper housing module 110, a rotor module 130, and a lower housing module 150. The upper and lower housing modules 110, 150 connect together (for example, at bolted connections 6a, 6b) to define a common interior, and the rotor module 130 is disposed within the common interior. Each of the modules 110, 130, 150 is configured to be independently assembled as a unit prior to assembling the modules 110, 130, 150 together. The modular structure of the pump 304 has several advantages, such as lower maintenance time and cost.

Figure 3A:
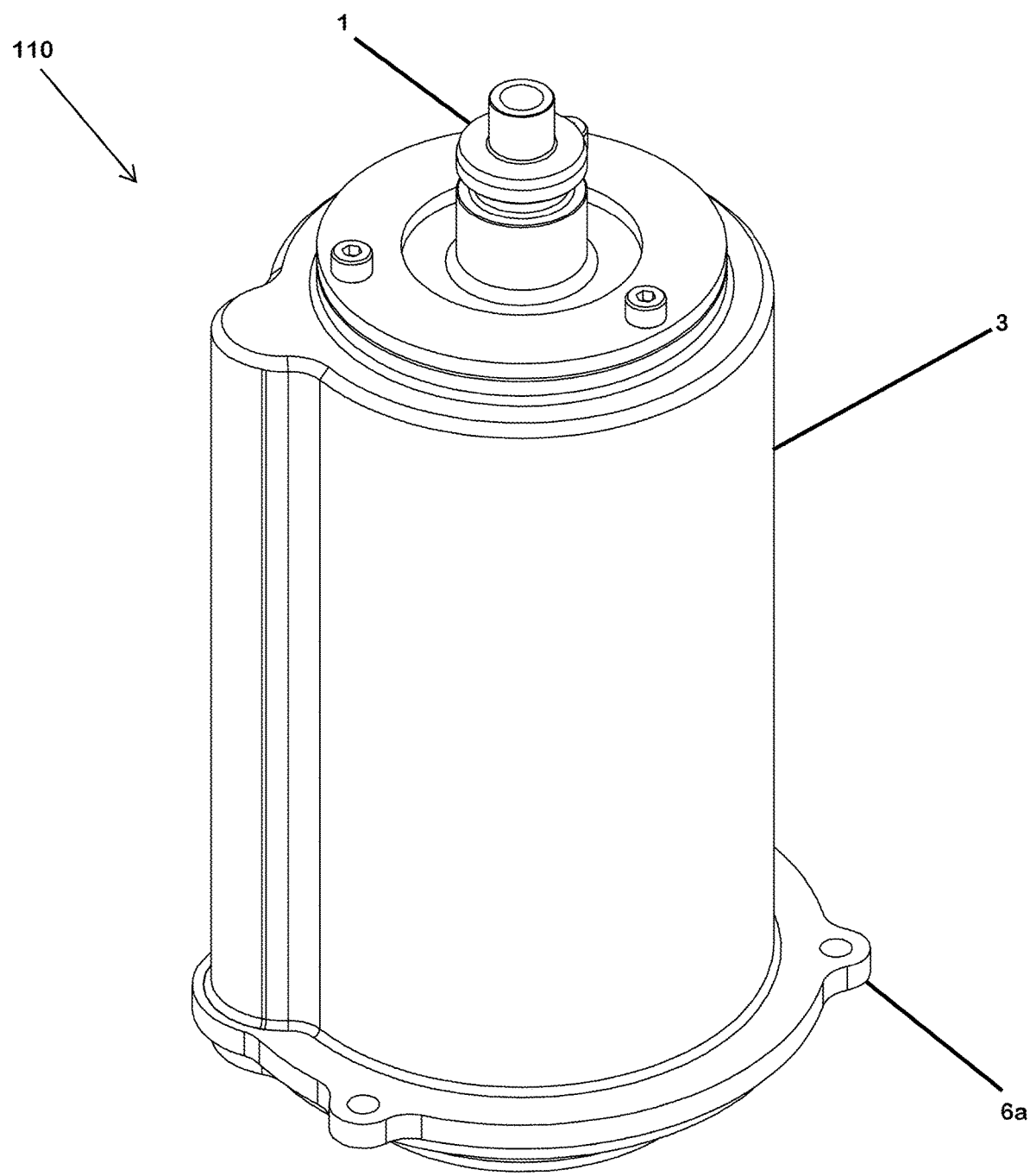
FIG. 3A is a top perspective view of an example upper housing module of the boost pump of FIG. 2A.
Figure 3B:
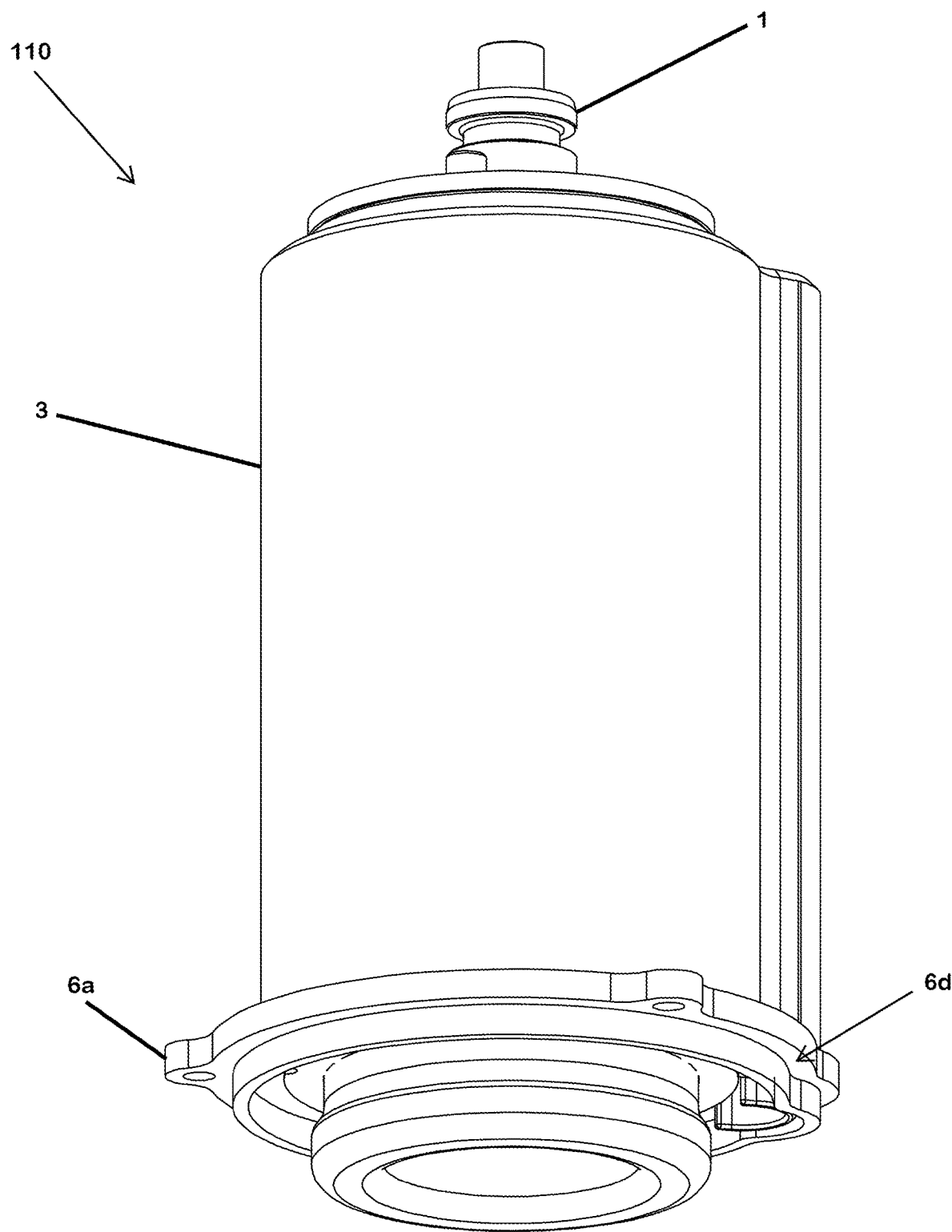
FIG. 3B is a bottom perspective view of the upper housing module of FIG. 3A.
Figure 3C:
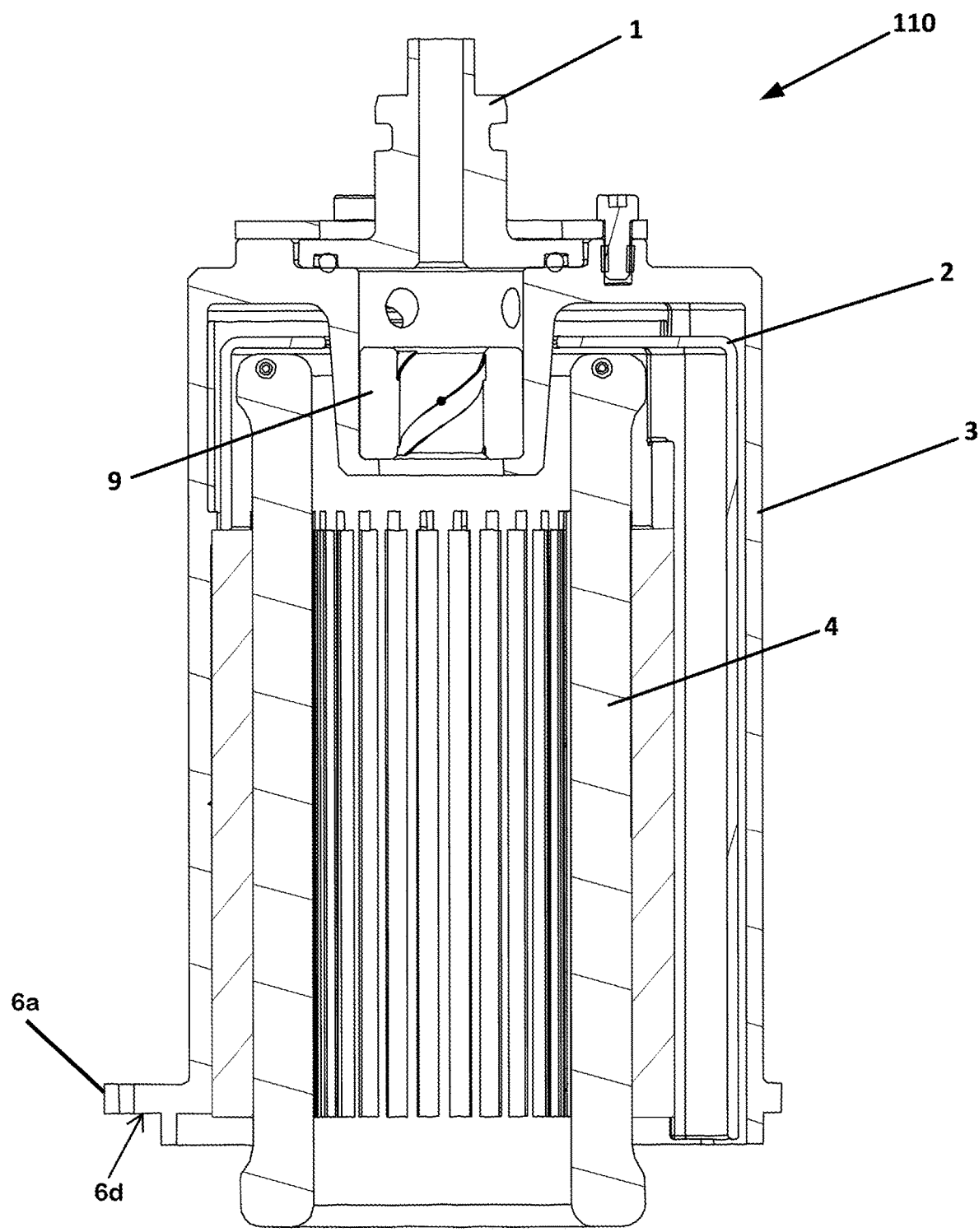
FIG. 3C is a cross-sectional view of the upper housing module of FIG. 3A.

FIG. 3A is a top perspective view of an example upper housing module 110. FIG. 3B is a bottom perspective view of the upper housing module 110. FIG. 3C is a cross-sectional view of the upper housing module 110. FIGS. 3A, 3B, and 3C are described concurrently and not all components described are visible in all of 3A, 3B, and 3C. The upper housing module 110 includes the following major components: a motor housing 3; a stator 4; an upper insulating sleeve 2; a motor coolant discharge flow connector 1; and an upper bearing 9. The upper insulating sleeve 2 electrically isolates an interior of the upper housing module 110 from the surrounding liquid hydrogen within the fuel tank 302.

Figure 4A:
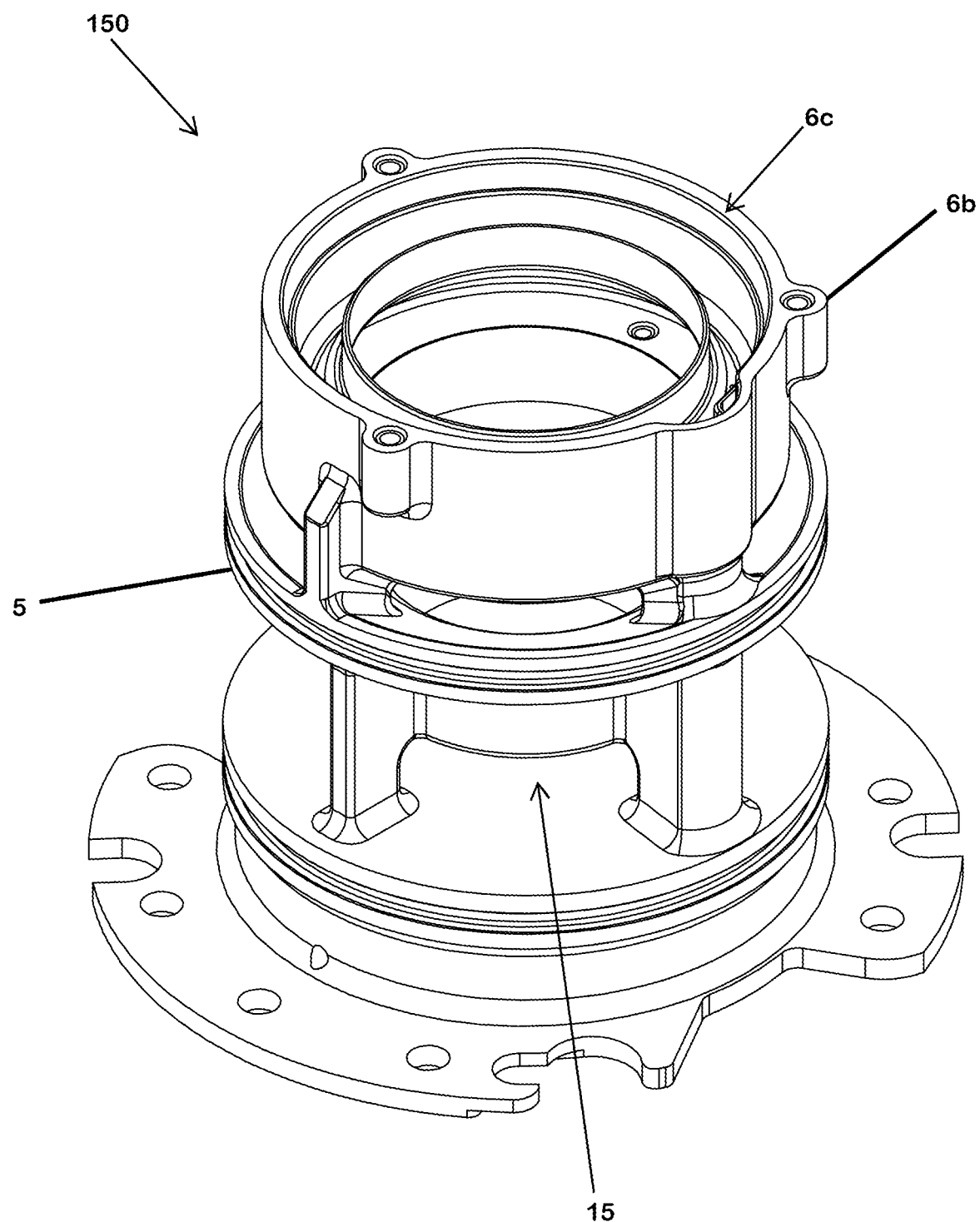
FIG. 4A is a top perspective view of an example lower housing module of the boost pump of FIG. 2A.
Figure 4B:
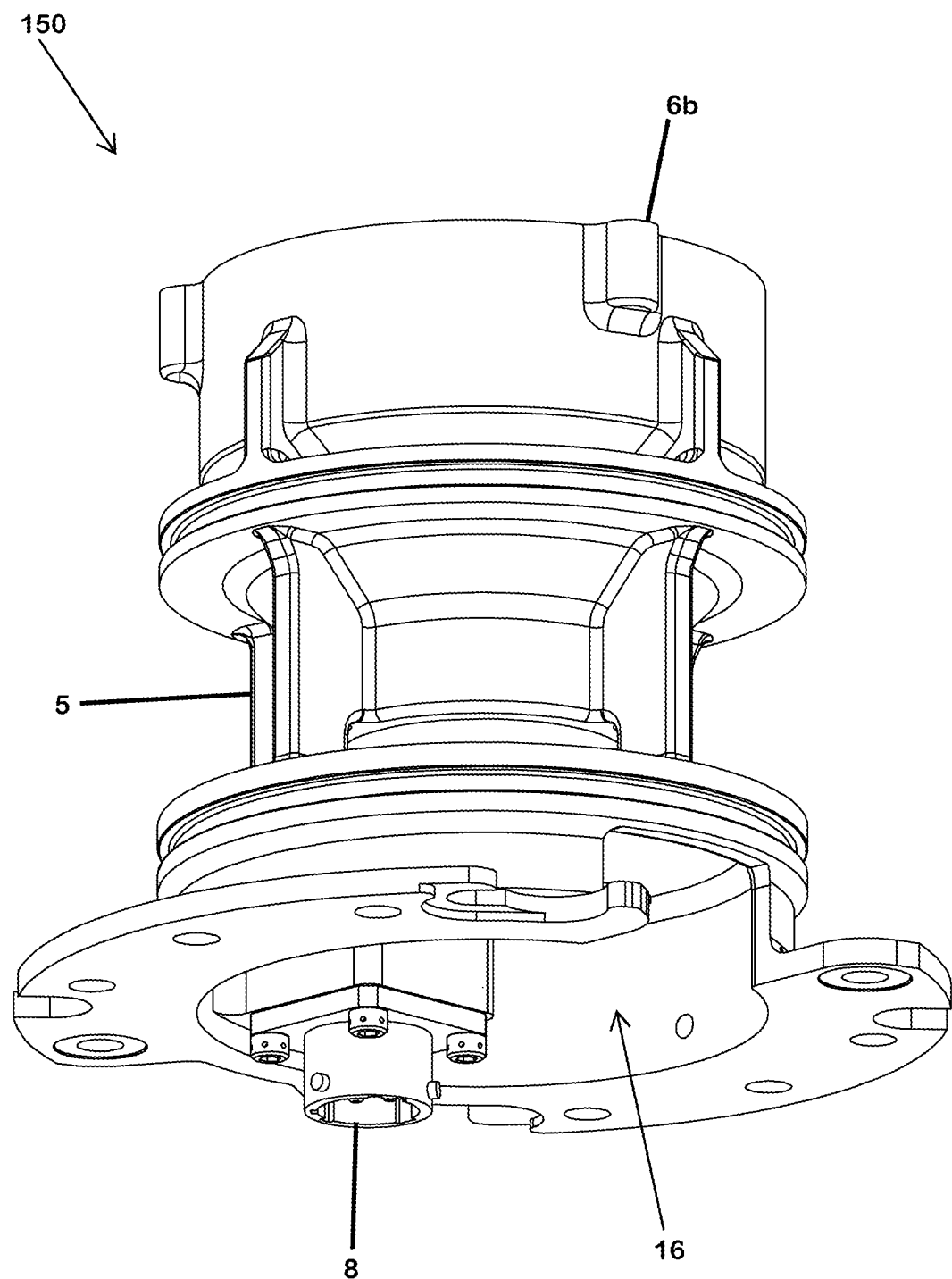
FIG. 4B is a bottom perspective view of the lower housing module of FIG. 4A.
Figure 4C:
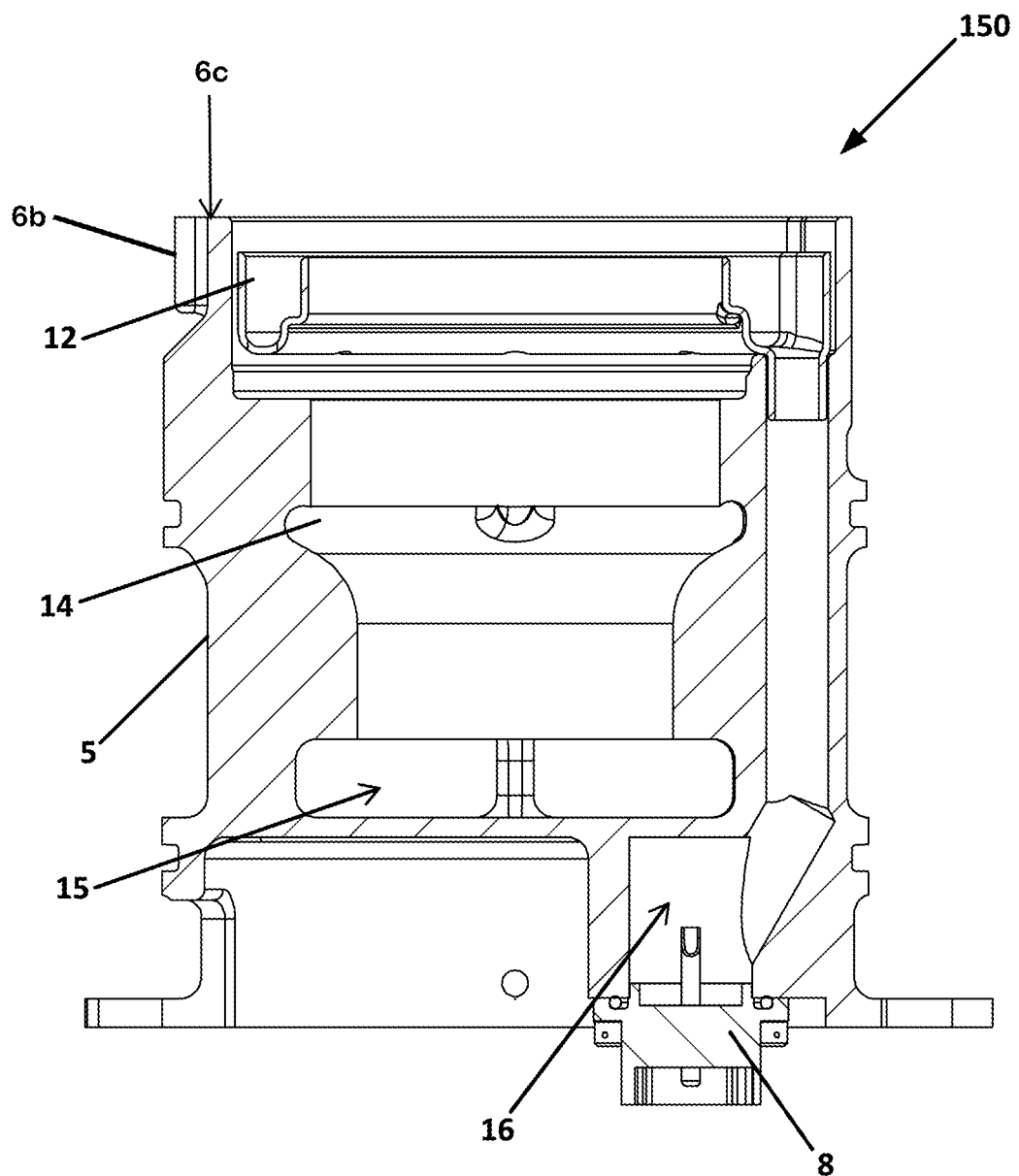
FIG. 4C is a cross-sectional view of the lower housing module of FIG. 4A.

FIG. 4A is a top perspective view of an example lower housing module 150. FIG. 4B is a bottom perspective view of the lower housing module 150. FIG. 4C is a cross-sectional view of the lower housing module 150. FIGS. 4A, 4B, and 4C are described concurrently and not all components described are visible in all of 4A, 4B, and 4C. The lower housing module 150 includes the following major components: a lower housing 5, a lower insulating sleeve 12, and an electrical connector 8. The lower housing 5 defines a mating interface 6c configured to abut a mating interface 6d of the motor housing 3 to form a common interior. In certain examples, the lower housing 5 includes an inlet 15 and/or a diffuser 14. In certain examples, the lower housing 5 defines a connector cavity 16 in which the connector 8 is at least partially disposed. In certain examples, the electrical connector 8 extends downwardly from the lower housing 5 opposite the mating interface 6c of the lower housing 5.

Figure 5A:
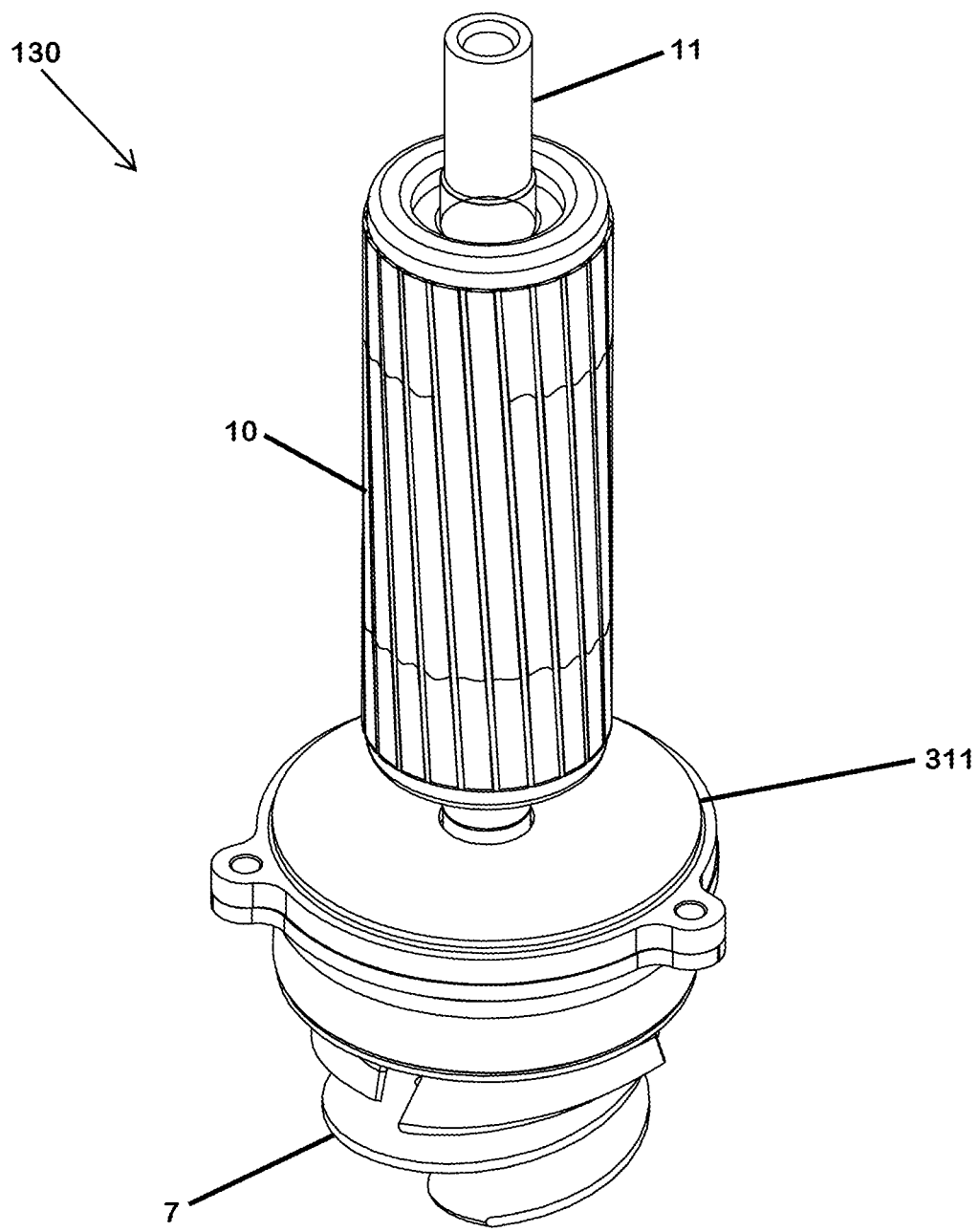
FIG. 5A is a top perspective view of an example rotor module of the boost pump of FIG. 2A.
Figure 5B:
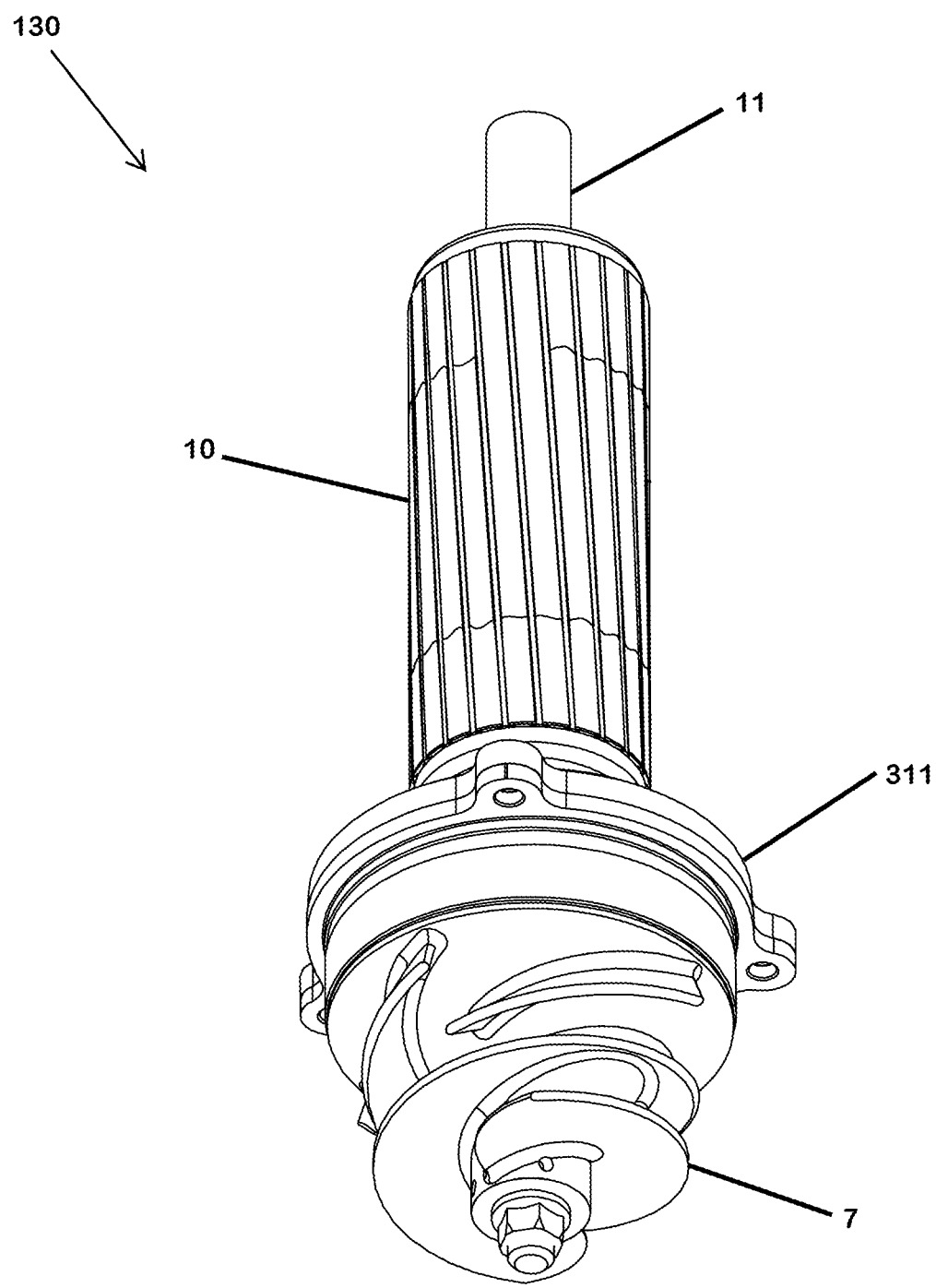
FIG. 5B is a bottom perspective view of the rotor module of FIG. 5A.
Figure 5C:
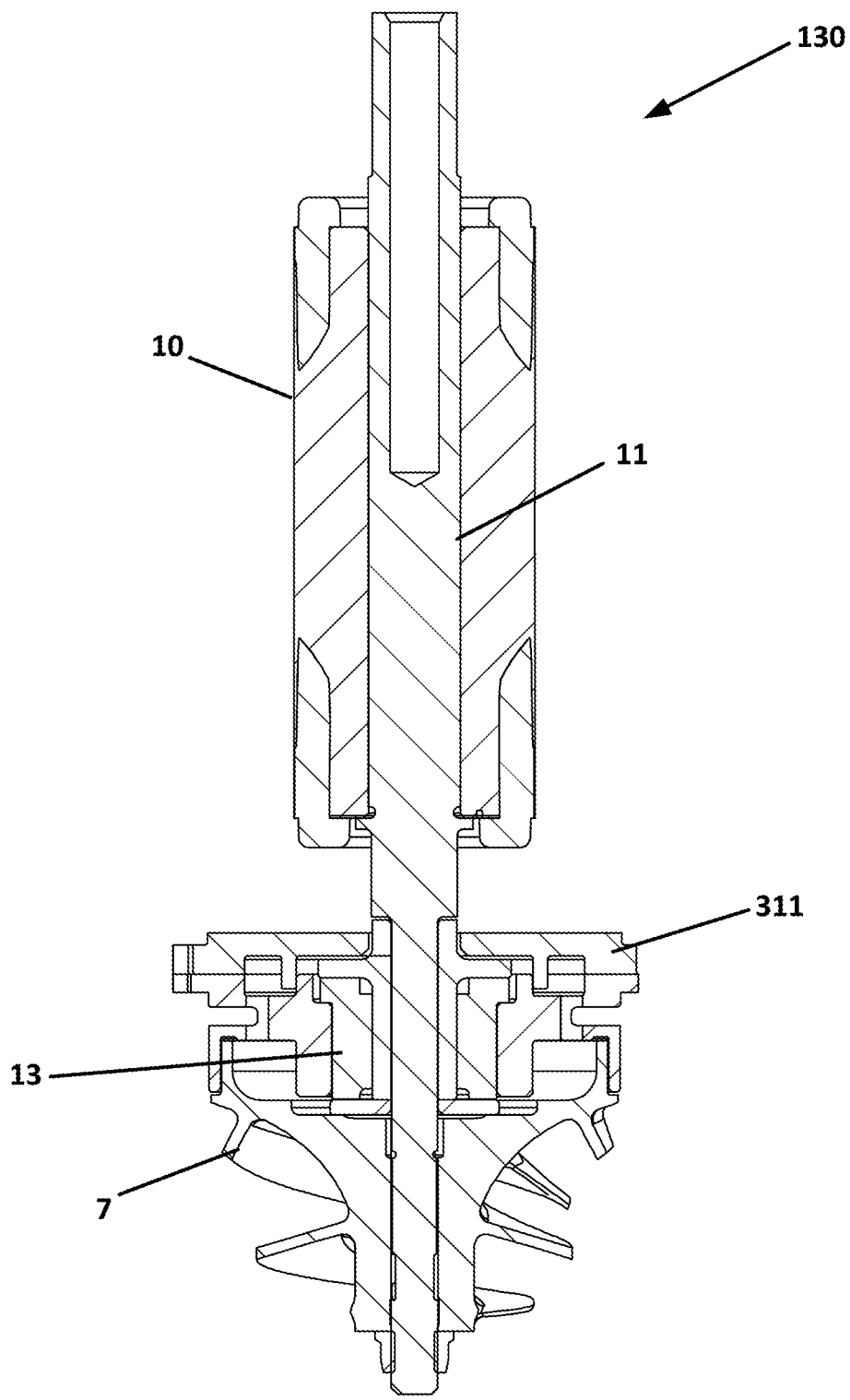
FIG. 5C is a cross-sectional view of the rotor module of FIG. 5A.

FIG. 5A is a top perspective view of an example rotor module 130. FIG. 5B is a bottom perspective view of the rotor module 130. FIG. 5C is a cross-sectional view of the rotor module 130. FIGS. 5A, 5B, and 5C are described concurrently and not all components described are visible in all of 5A, 5B, and 5C. The rotor module 130 includes the following major components: a rotor 10; a shaft 11; an impeller 7; and a lower bearing 13. The rotor 10 and the impeller 7 are driven by the shaft 11. The lower bearing 13 cooperates with the upper bearing 9 of the upper housing module 110 to support the shaft 11 within the cavity defined by the assembled pump motor housings 3, 5.

The upper and lower insulating sleeves 2, 12 of the pumps 304 can have a thermal insulating construction (e.g., a ceramic construction and/or fibrous construction) and can be adapted for providing a thermal barrier between portions of the electric motor and the exterior of the pump. The lower insulating sleeve 12 can define an annular passage for storing extra length of wiring routed from the connector 8 to the electric motor. The stator is part of a stator/coil assembly of the electric motor that does not rotate with the shaft 11 and is fixed against rotation relative to the housings 3, 5. The rotor 10 is part of a rotor/coil assembly that rotates with the shaft 11. The impeller 7 also rotates with the shaft 11. The upper bearing 9 supports rotation of the shaft 11 relative to the motor housing 3 and the lower bearing 13 supports rotation of the shaft 11 relative to the lower housing 5. A support piece 311 supports the lower bearing 13 relative to the lower housing 5.

The pump design architecture shows the usage of a single-stage mixed flow impeller. Depending on the specific design requirements, the impeller could be centrifugal, mixed flow, radial type, or other appropriate type. A multistage impeller may be used in examples where there exists a limit in the pump diameter, a higher pressure increase, or an improvement in efficiency is achieved from doing so. The electric motor (e.g., including the stator, the rotor, the shaft, and the coil) could be constant speed or variable speed AC induction motor, or a DC motor. In the case of a variable speed motor, the electronics may be placed outside the fuel tank where environmental conditions are more favorable.

Figure 6:
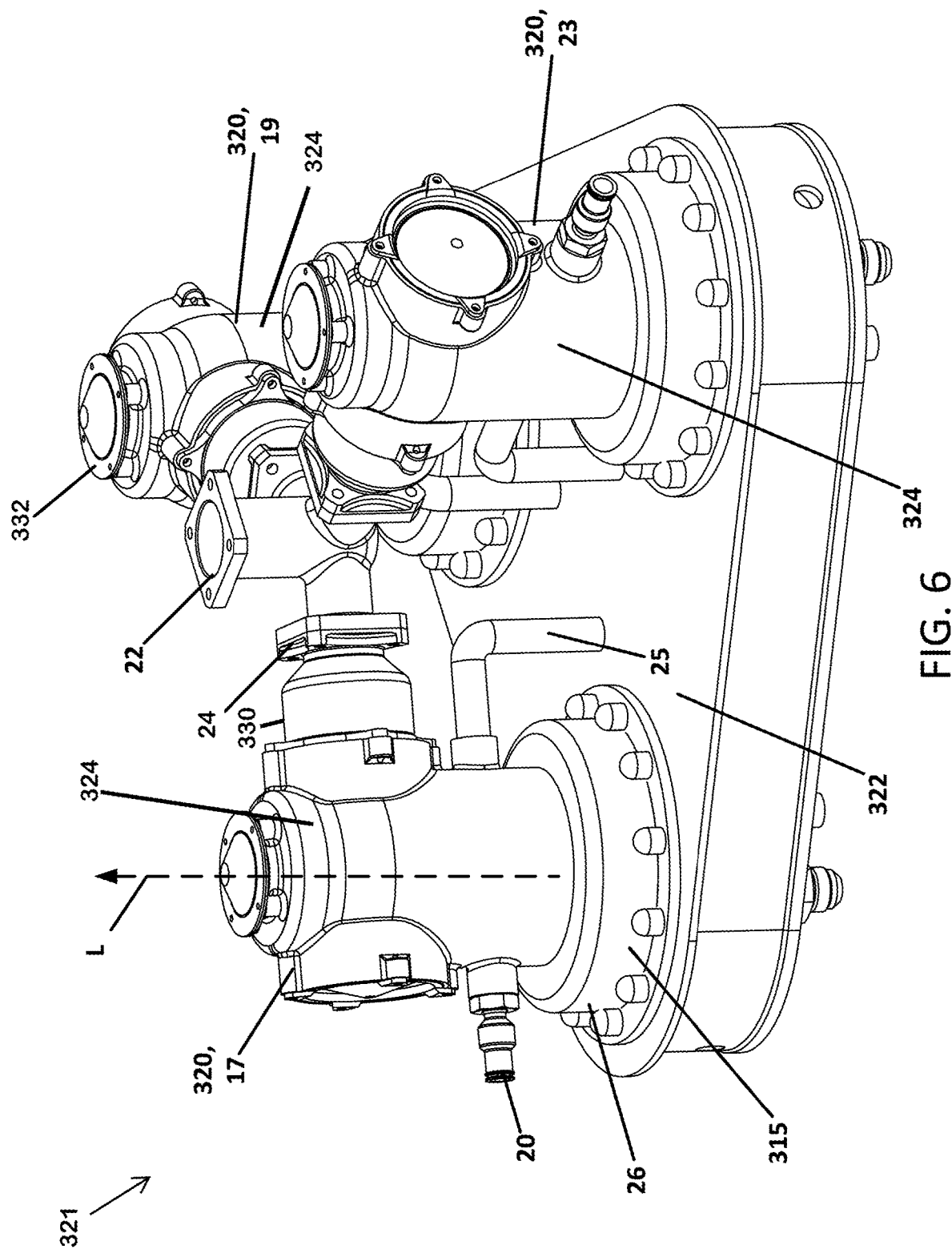
FIG. 6 depicts a boost pump mounting arrangement in accordance with the principles of the present disclosure including an arrangement of canisters, according to an example.

FIG. 6 depicts a boost pump mounting arrangement 321 in accordance with the principles of the present disclosure including an arrangement of canisters 320. To facilitate efficient (easier) replacement, each of the pumps 304 is placed inside a separate canister 320 which is positioned at a canister pad 322. Each canister pad 322 includes three canisters 320 and thus can hold three pumps 304. In certain examples, only one or two of the pumps 304 will be in operation depending on the phases of the flight. In such examples, the third pump 304 is redundant. The LH2 from the tank 302 enters the pumps 304 through inlets 315 and gets kinetic energy while passing through the impellers 7 of the pumps 304. The pumps 304 are preferably electrical pumps driven by electrical power supplied to the pumps through the connectors 8.

Figure 7:
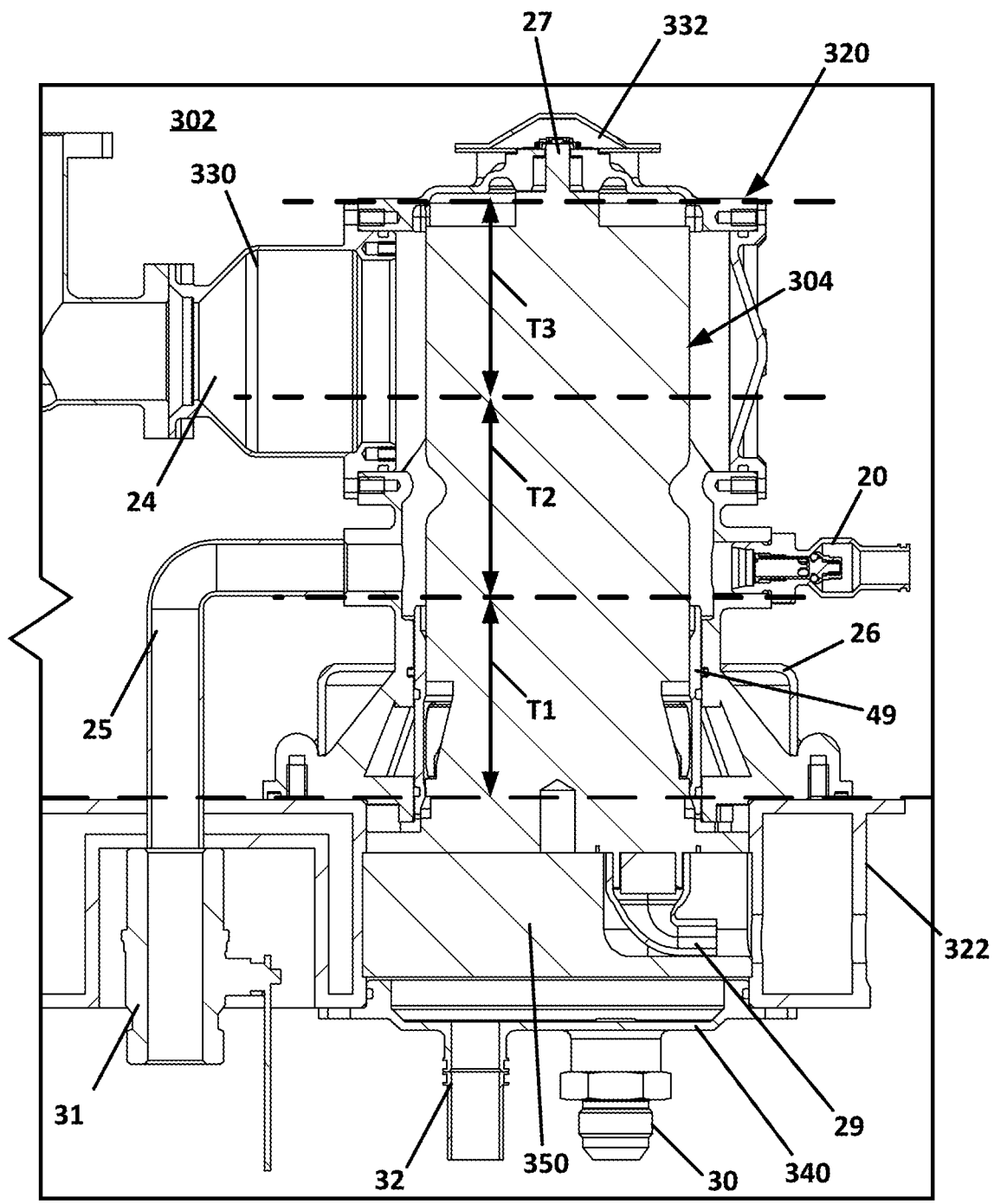
FIG. 7 is a cross-sectional view of one of the canisters of the mounting arrangement of FIG. 6.

FIG. 6 depicts canister and pump installation on a canister pad 322. FIG. 7 is a cross-sectional view of one of the canisters 320. The canister pad 322 is installed at the bottom of the tank 302. The three canisters 320 (see first canister 17, second canister 19, and third canister 23) are installed along with their pumps 304 contained inside the canisters 320 on the bottom of the fuel tank. The installation pad 322 is isolated from the aircraft outer skin by an insulator plate (e.g., the outer surface of the skin may be provided at an outer side of the insulator plate). The insulator plate helps to minimize the heat transfer. In certain examples, the insulating pad extends across all three pumps 304. The canister pad 322 may be integrated with a bottom wall of the fuel tank.

Each canister 320 includes a peripheral wall 324 extending around a longitudinal axis L of the canister 320. Each pump 304 has an inlet 15 defined by openings spaced about the circumference of the lower housing 5 (e.g., see FIG. 2B). In certain implementations, each canister 320 has a slide valve 49 which remains closed when there is not any pump inside the canister 320 and thus prevents any flow across the inlet 15. The slide valve 49 opens when the pump 304 is inserted inside the canister 320 to allow the flow across the inlet 15. First and second seals 51a, 51b (e.g., radial seals) such as O-rings are provided around the periphery (e.g., the circumference) of the lower housing 5 for sealing against an interior of the canister 320 at locations above and below the inlet 15 when the pump 304 is installed within the canister 320.

Each pump 304 has two outlets to the fuel tank 302. In FIG. 7, these outlets are depicted as a primary outlet (or discharge line) 330 and a motor cooling outlet 332. Referring to FIG. 6, the primary outlet (or discharge line) 330 of each of the three pumps 304 connects with a fuel discharge outlet 22 (e.g., an outlet to the fuel line providing fuel to the engine fuel pump and the fuel cell as shown at FIG. 1). LH2 pressurized by the impeller 7 flows through a plenum defined between the pump 304 and the canister 320 to the primary outlet (or discharge line) 330 which is defined by the canister 320. A discharge valve or check valve 24 is provided at the primary outlet (or discharge line) 330 for allowing one-way flow out of the canister through the primary outlet (or discharge line) 330. The motor cooling outlet is defined by the motor coolant discharge connector 1 at the top of the pump 304. A first seal 52 (e.g., a face seal) seals the connector 1 relative to the motor housing 3 and a second seal 53 (e.g., a radial seal) seals the connector 1 relative to the canister 320 when the pump 304 is installed in the canister 320. LH2 from the impeller 7 flows axially through the motor and is discharged from the pump 304 through the connector 1 to provide motor cooling.

In certain implementations, the pump cavity housing is approximately cylindrical, with the inlet 15 located at the bottom of the fuel tank 302, which will help to utilize the tank fuel entirely. Fuel enters the pump inlet 15 through a screen 26, passes through the impellers 7 and diffusers 14, and exits through the check valve 24 at the primary outlet or discharge line 330 into the fuel discharge outlet 22 leading to the engine pump. The check valve 24 at the main outlet of each pump will ensure no reverse flow occurs while the pump is not operating. A secondary flow check valve 27 at the secondary flow outlet opens when the pump is inside the canister due to the connector 1, but prevents reverse flow when the pump is not in the canister 320.

Liquid hydrogen may be purged from the pump via purging line 25 and shutoff valve 31 integrated with the canister installation unit. The canister 320 also contains a purge outlet connection 20 that includes at least one purge exit valve. There are two functions of this purge outlet connection 20: a) allowing trapped LH2 in the pump to purge into the tank during pump removal; and b) recirculating the excess LH2 flow back to the tank to minimize heat generation, flow recirculation, and cavitation at low outlet flow conditions. The purge outlet connection 20 also contains an orifice/nozzle to reduce the pressure of the purged liquid in the tank. The shutoff valve 31 can be opened to allow purging fluid to flow into the pump 304 through the purge line 25 and can be closed to prevent fluid from flowing out of the pump 304 through the purge line 25 when purging is not underway.

An electrical connector 29 (e.g., which connects with connector 8 of the pump 304) is located in a connector box cavity 350 (e.g., a chamber including the connector cavity 16) below the bottom of the tank 302. In examples, the electrical connector 8 is hermetically sealed from the fuel tank 302. The connector box cavity 350 has an inlet connected with a valve 32 and an outlet connection with another valve 30. The hermetic box valve helps keep the connector in a pressurized gaseous Helium (GHe) environment. The arrangement of the connector box cavity 350 helps to prevent any ice development on the connector 29 by eliminating the presence of air around the connector via the presence of pressurized helium gas. In certain examples, a cover plate 340 closes the connector box cavity 350. In certain examples, the inlet valve 32 and the outlet valve 30 are carried with a connector box plate 340 that mounts in sealed relation to a bottom side of the canister pad 322. The connector box is defined between the bottom of the pump 304 and the connector box plate 340. A removable insulator can mount within the connector box above the plate 340.

The canister 320 and the pump 304 have a locking mechanism that allows the pump 304 to be inserted and removed with respect to the canister 320 in only a certain way. An important consideration for in-tank pump installation is to adopt a process whereby the fuel pumps 304 can be replaced quickly and safely without requiring the liquid-hydrogen fuel tank 302 to be drained.

In certain examples, the purging line 25 and the purge outlet connection, or purge exit valve, 20 are located at a mid-region of a length of the canister 320. In one example, if the length of the peripheral wall 324 of the canister 320 were to be divided into thirds T1, T2, T3, then the purge line 25 and the purge outlet/exit valve 20 would be located somewhere within the middle third T2 (e.g., see FIG. 7).

In a preferred example, the connectors 8, 29 are not located (e.g., immersed) in the tank, but are instead below the tank. In a preferred example, the connectors 8, 29 are demateable electrical connectors that are located at a bottom of the pump 304 when the pump 304 is installed in its corresponding canister 320.

Figure 8A:
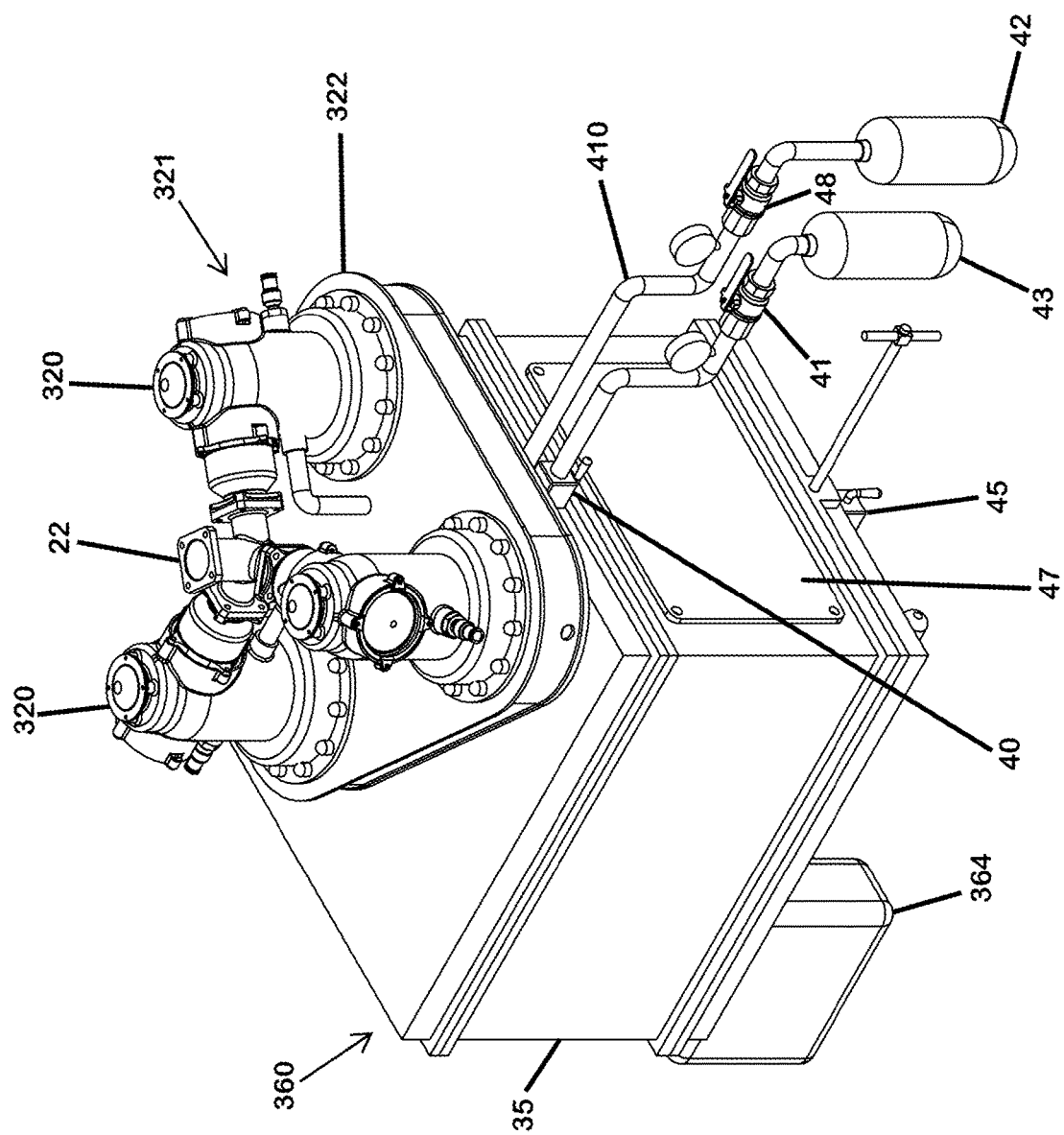
FIG. 8A depicts a top perspective view of a pump changing tool and system, according to an example.
Figure 8B:
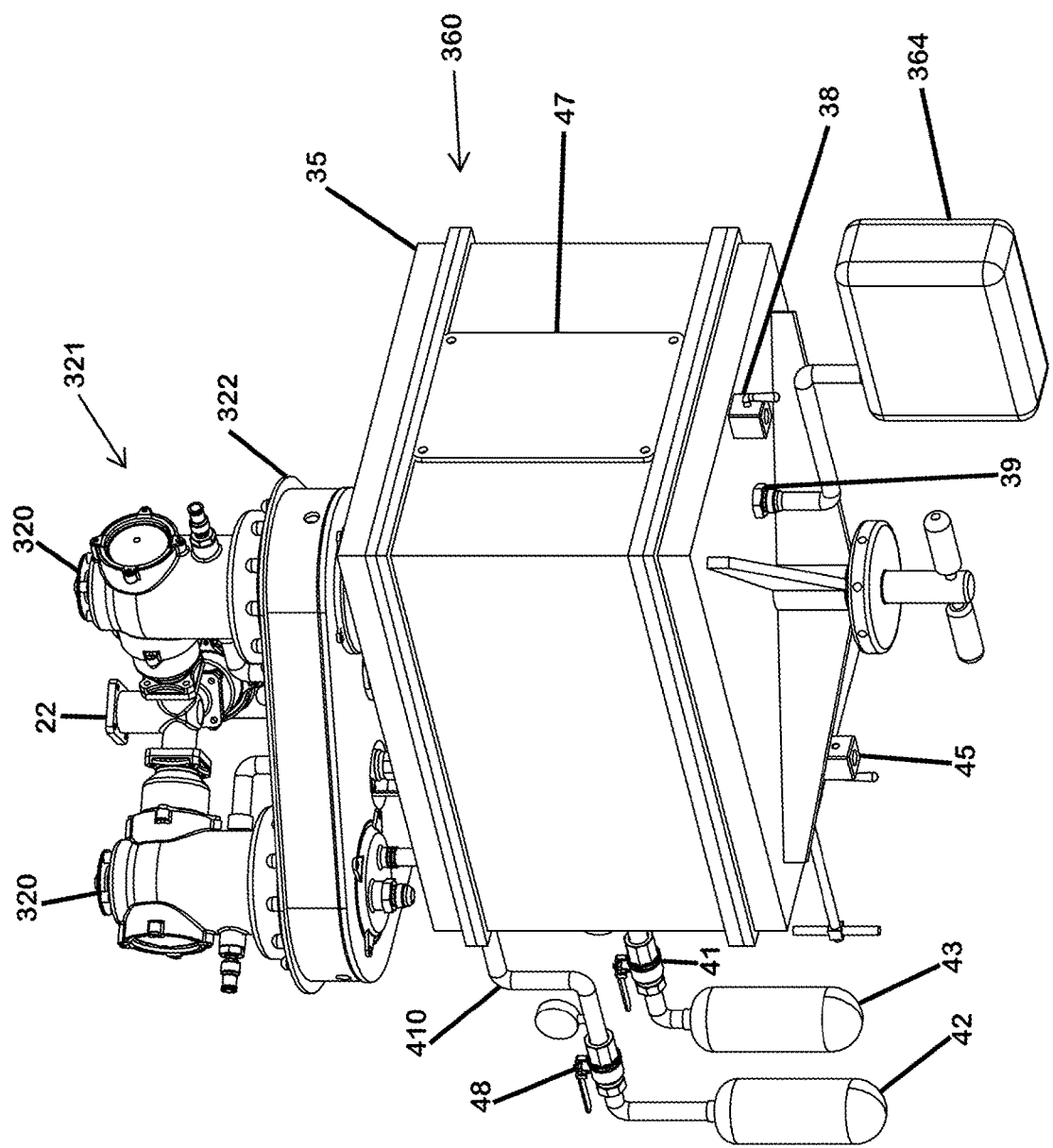
FIG. 8B depicts a bottom perspective view of the pump changing tool and system of FIG. 8A.
Figure 8C:
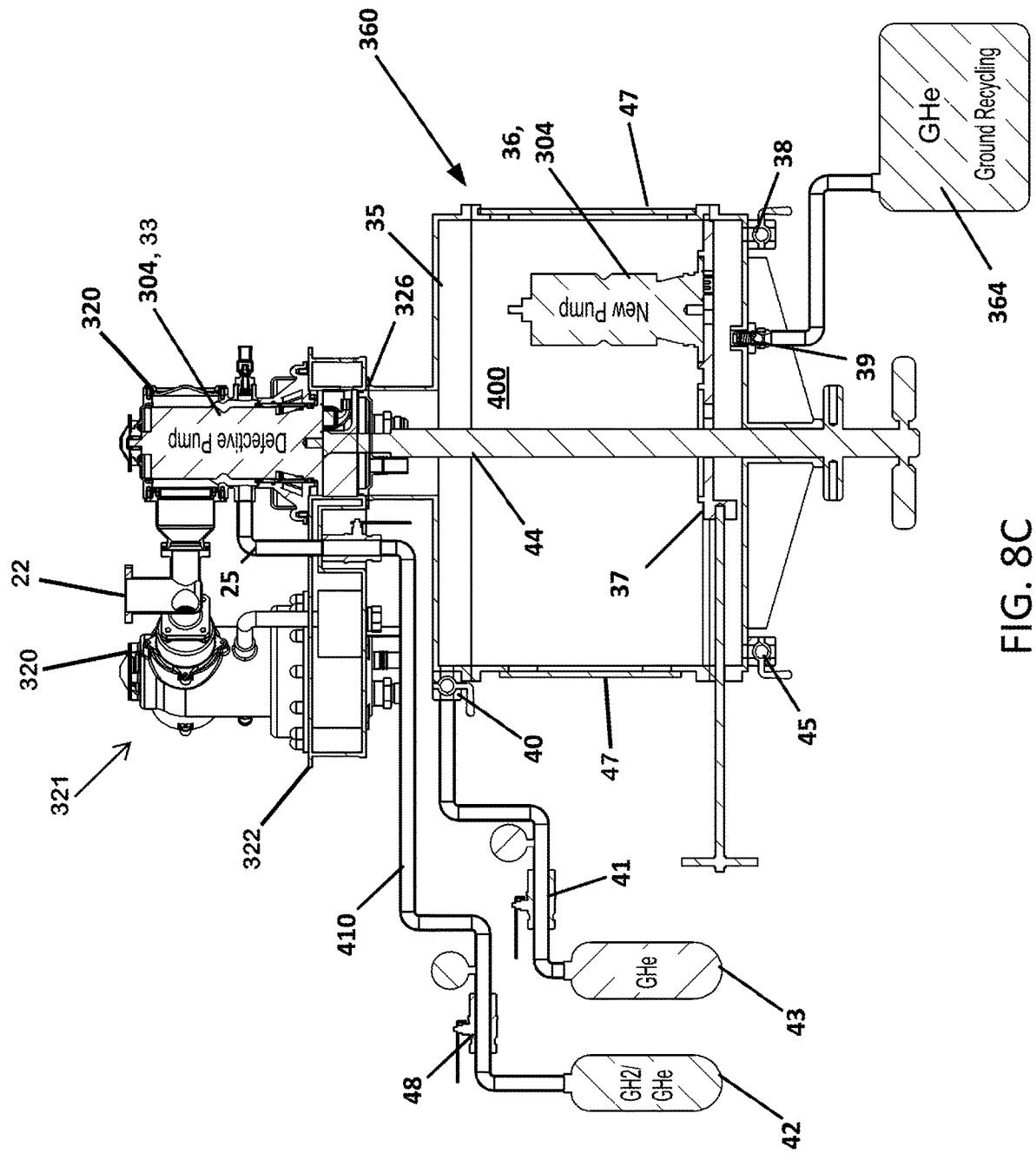
FIG. 8C depicts a cross-sectional view of the pump changing tool and system of FIG. 8A.

FIG. 8A depicts a top perspective view of a pump changing tool 360 (also referred to as a toolbox system 360) and boost pump mounting arrangement 321 pump systems. FIG. 8B depicts a bottom perspective view of the pump changing tool 360 FIG. 8C depicts a cross-sectional view of the pump changing tool 360. FIGS. 8A, 8B, and 8C are described concurrently and not all components described are visible in all of 8A, 8B, and 8C. The tool 360 includes a pump changing toolbox 35, which includes a carrier plate 37 and a pump removing rod 44 disposed within a main chamber 400. The toolbox 35 includes a port 326 configured to mount to the canister pad 322 in alignment with one of the canisters 320. The port 326 sealingly mounts to the canister pad 322. The toolbox 35 also includes a flow inlet valve 40, and an outlet valve 39 that is in fluid connection with a ground helium collection unit 364. The toolbox 35 also includes a pressure relief valve 45. In certain examples, the toolbox 35 also includes a suction valve 38. In certain examples, the toolbox 35 defines two transparent access windows 47.

The toolbox 35 defines a main chamber 400 in which the carrier plate 37 is located. The carrier plate 37 carries a replacement pump 36. Once the lower insulating plate, the cover plate (or connector box plate) 340, and the insulator have been removed from beneath the canister pad 322, and the connectors 8, 29 have been disconnected from each other, the toolbox 35 can be mounted in sealed relation with respect to the canister pad 322 such that the main chamber 400 is sealed relative to the canister pad 322.

In certain examples, the suction valve 38 is adapted to be connected to a source of vacuum that can draw air from the interior of the sealed main chamber 400 and the interior of the replacement pump 36 within the chamber 400. The suction valve 38 not only facilitates evacuating air from the main chamber 400, but also evacuates air from within the replacement pump 36.

A source of gaseous helium 43 is selectively in fluid communication with the chamber 400 (e.g., via a helium shut-off valve 41) for directing gaseous helium into the chamber 400 after the air has been evacuated. A ground helium collection unit (or recycling chamber) 364 is selectively in fluid communication with the chamber 400 for collecting the gaseous helium directed into the chamber 400 for re-use.

A purge line 410 that connects with the purge line 25 when the toolbox 35 may be coupled to the pad 322. In some examples, the purge line 410 is coupled to the toolbox 35. In other examples, the purge line 410 is separate from the toolbox 35. Purge line 410 is selectively (e.g., via shutoff valve 48) in fluid communication with a source of purging fluid 42 for providing purging fluid directed through the purge line 25 for purging LH2 from a defective pump 33. In some examples, the purging fluid is gaseous hydrogen (GH2). In other examples, the purging fluid is gaseous helium (GHe). For convenience, the purging fluid will be referred to as GHe/GH2, which will be understood to mean alternatively gaseous helium or gaseous hydrogen.

Figure 9:
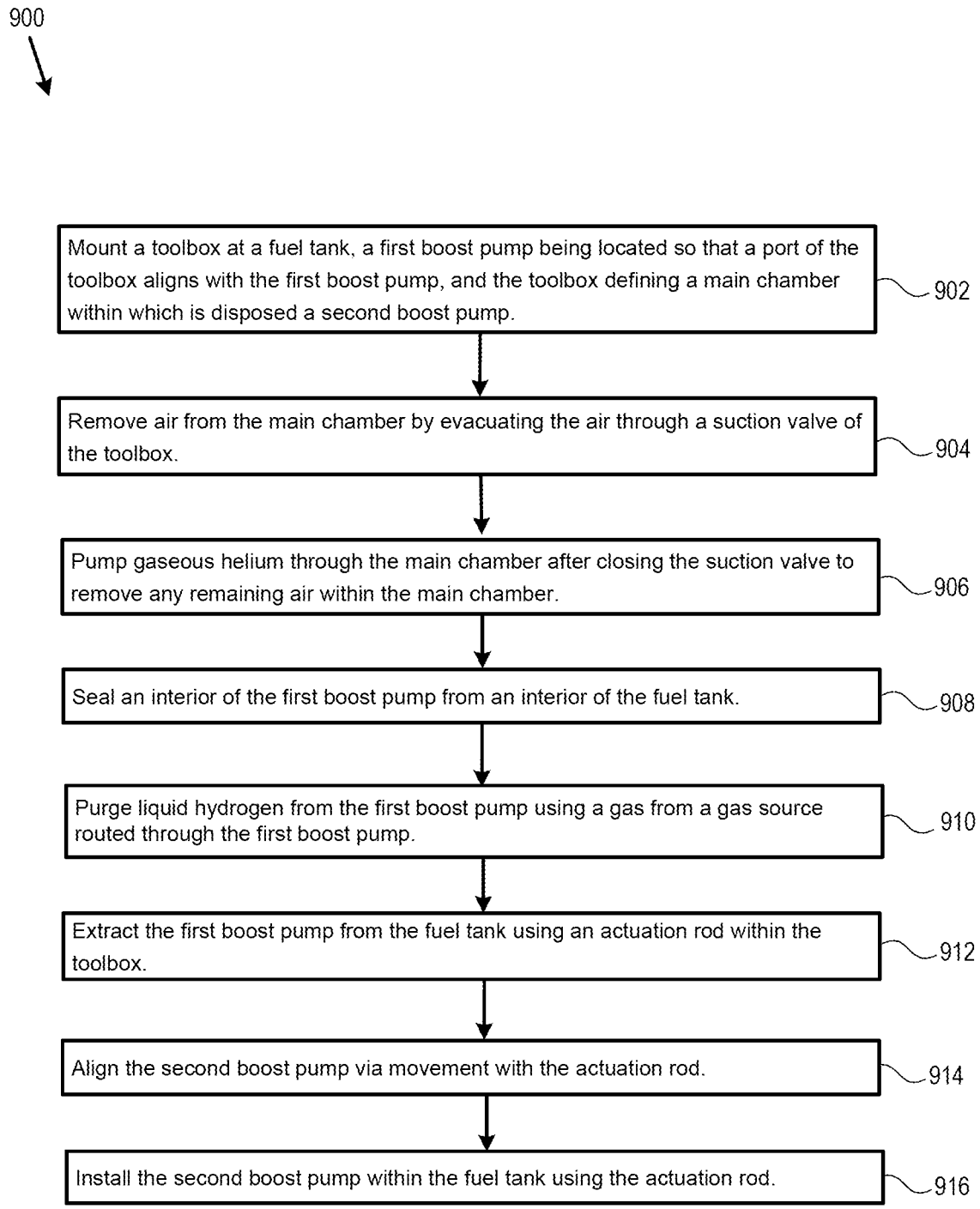
FIG. 9 depicts an example method for replacing a boost pump.

FIG. 9 depicts an example method 900 for replacing a boost pump. The method for replacing a first boost pump of an aircraft liquid hydrogen fuel system (for example, a boost pump in need or maintenance or that is defective) with a second boost pump may include at least the following operations.

At operation 902, a toolbox (tool) may be mounted at a fuel tank in which the first boost pump is located so that a port of the toolbox aligns with the first boost pump. The toolbox may define a main chamber within which is disposed a carrier plate, and the second boost pump may be seated on the carrier plate.

At operation 904, air is removed from the main chamber by evacuating the air through a suction valve of the toolbox.

At operation 906, gaseous helium (or, in some examples, another suitable inert gas) is pumped through the main chamber after closing the suction valve to remove any remaining air within the main chamber.

At operation 908, an interior of the first boost pump is sealed from an interior of the fuel tank.

At operation 910, liquid hydrogen is purged from the first boost pump using a gas from a gas source routed through the first boost pump.

At operation 912, the first boost pump is extracted from the fuel tank using an actuation rod within the toolbox and the first boost pump is positioned on the carrier plate.

At operation 914, the carrier plate is moved to align the second boost pump with the actuation rod.

At operation 916, the second boost pump is installed within the fuel tank using the actuation rod.

An example process or method by which a pump 304 (for example, a defective pump or a pump requiring maintenance) is replaced with a replacement pump 36 may include the following operations.

The insulating panel may be removed from the bottom of the canister pad 322. The connector 8 may be disconnected. The pump changing tool 360 containing the new pump 36 may be secured to the pump housing/canister 320 external locking lugs. The connecting surface between the tool 360 and the canister pad 322 may be sealed by use of the O-ring. A vacuum pump may be connected to the suction valve 38, which may be operated to remove the air inside of the tool 360 and the new pump 36. At the end of the operation of the vacuum pump, the suction valve may be closed and the vacuum pump may be disconnected.

The GHe supply 43 may be joined to the pump changing tool housing, and the supply may be opened. The GHe will enter (flow) through the inlet 40 and purge any remaining air of the new pump and changing box by forcing the flow through the valve 39 and collected in the ground recycling chamber 364.

The GHe/GH2 42 supply may be joined to the GHe/GH2 purge valve port in the pump lower housing plate. Alternatively, GHe/GH2 can be supplied for purging. GHe is a very costly gas and negatively impacts the engine and some materials such as glass fiber. Separating GHe from the tank ullage may be challenging in some circumstances. Alternatively, GH2 may be advantageously used for purging as it does not freeze and does not require any separation process.

With the help of a pump extracting rod/tool, the pump may be rotated to 45 degrees to disengage the lugs, and the pump is pulled down by a small distance so that the inlet closure slide valve 49 blocks the pump inlet 15 to stop any flow across it. Simultaneously or near simultaneously, the secondary flow valve 27 may also be closed. Thereby, the pump is wholly isolated from the tank. In some examples, an amount of LH2 may remain trapped in the tank, which needs to be safely passed. The GHe/GH2 purge valve is opened, and the GHe/GH2 enters into the pump. The high-pressure GHe/GH2 may purge the trapped LH2 in the tank via the valves 24, 27, and Upon completion of purging, the GHe/GH2 supply valve is closed, the operating handle is turned another 45 degrees to disengage the closure sleeve locking lugs, and the pump is completely withdrawn and placed on the carrier plate in the changing tool.

The new pump may be positioned using the carrier plate actuating/removing rod 44. The new pump may be inserted into the canister using the operating rod reversely. The purging operation has been stopped at this point, so the purging lines and changing tool are removed. The connector 8 may be re-connected. The connector box cover plate containing the purge valves 30, 32 may be attached. The GHe purge connection may be attached to the inlet purge valve line 32.

The connector box/cavity is purged and then the purging connection may be removed. This process will replace any air/contaminants from the connector cavity and prevent icing. The purging valves 30 and 32 keep the connector box with pressurized GHe. The cover plate may be replaced.

In some examples, the electrical connector 8 of the boost pump 304 may be disconnected from an electrical connector of an aircraft wiring loom prior to sealing the interior of the first boost pump 304; and an electrical connector 8 of the second boost pump 36, 304 may be connected to the electrical connector 29 of the aircraft wiring loom after installing the second boost pump within the fuel tank 302.

There are several benefits of the changing process which include (but are not limited to): (a) reduced chance that foreign matter (such as particulates, vapor, or air that might condense or freeze at liquid-hydrogen temperatures) can enter the pump cavity; (b) ensures safety of the pump mechanic from accidental leakage of LH2; and (c) the pump changing tool will help precisely locate the pump inside the canister. In certain examples, the above-said process also can be achieved through an automatic or driven robotic automation process where no human intervention will be required.

Example Aspects of the Disclosure

Aspect 1. An electric motor pump and canister system comprising: a canister pad (322) configured to bound part of a fuel tank (302), the canister pad (322) defining a cavity (350); a canister (320) mounted to the canister pad (322), the canister (320) being positioned to be disposed within the fuel tank (302) when the canister pad (322) is mounted at the fuel tank (302), the canister (320) being mounted so that a bottom opening of the canister (320) aligns with the cavity (350) of the canister pad (322), the canister (320) defining a longitudinal axis (L) extending from a bottom of the canister (320) at the canister pad (322) to a top of the canister (320), the canister (320) including a discharge valve (24); and an electric motor pump (304) disposed within the canister body (320), the electric motor pump (304) extending through the bottom opening of the canister (320) so that part of the electric motor pump (304) extends into the cavity (350) defined by the canister pad (322) to seal part of the cavity from the fuel tank (302), and the electric motor pump (304) including a demateable electrical connector (8) disposed within the part of the cavity (350) that is sealed from the fuel tank (302).

Aspect 2. The electric motor pump and canister system of aspect 1, wherein the demateable electrical connector (8) is a first demateable electrical connector; and wherein the electric motor pump and canister system further comprises an electrical wiring harness including a second demateable electrical connector (29) that is movably mounted within the cavity (350), and wherein the second demateable electrical connector (29) is configured to mate with the first demateable electrical connector (8) to supply power to the electric motor pump.

Aspect 3. The electric motor pump and canister system of aspect 1, further comprising: a fuel tank body to which the canister pad (322) mounts to form the fuel tank (302); and liquid hydrogen disposed within the fuel tank (302).

Aspect 4. The electric motor pump and canister system of aspect 1, wherein the canister (320) comprises: a canister body defining an interior, the canister body including a peripheral wall (324) extending around the longitudinal axis (L), the peripheral wall (324) defining an inlet (315) at the bottom of the canister body; a discharge line (330) is mounted to the peripheral wall (324) of the canister body at the top of the canister body; and a purge line (25) extends through the peripheral wall (324) of the canister body, the purge line (25) being disposed intermediate the top of the canister body and the bottom of the canister body so that the purge line (25) is spaced from the discharge line (330) along the longitudinal axis.

Aspect 5. The electric motor pump and canister of aspect 4, further comprising a purge exit valve (20) mounted to the canister body at a location intermediate the top of the canister body and the bottom of the canister body.

Aspect 6. The electric motor pump and canister of aspect 1, wherein the electric motor pump (304) is disposed within the interior of the canister body, the pump (304) defining a pump inlet (15) aligned with the inlet (315) of the canister body, a rotor (10) being aligned with the discharge line (330) and the purge line (25).

Aspect 7. The electric motor pump and canister of aspect 6, wherein the electric motor pump (304) further comprises: a plurality of modules that assemble together to form the pump (304), each of the modules being configured to be independently assembled as a unit prior to assembling the modules together, the plurality of modules including:

(a) an upper housing module (110) including:
 a motor housing (3);
 a stator (4) disposed within the motor housing (3);
 an upper insulating sleeve (2) disposed between part of the stator (4) and part of the motor housing (3);
 a motor coolant discharge flow connector (1); and
 an upper bearing (9);

(b) a rotor module (130) including:
 a drive shaft (11);
 a rotor (10) driven by the drive shaft (11);
 an impeller (7) driven by the drive shaft (11); and
 a lower bearing arrangement surrounding a portion of the drive shaft (11), the lower bearing arrangement including a lower bearing (13) supporting the shaft (11); and (c) a lower housing module (150) including:
 a lower housing (5) defining the inlet (15) and being configured to mount to the canister pad (322);
 a lower insulating sleeve (12) disposed at the lower housing (5); and
 the demateable electrical connector (8) coupled to the lower housing (5) so that the inlet (15) is disposed between the demateable electrical connector (8) and the lower insulating sleeve (12);

wherein the upper and lower housing modules (110, 150) connect together to define a common interior; and wherein the rotor module (130) is enclosed within the common interior.

Aspect 8. The electric motor pump and canister of aspect 6, further comprising a slide valve (49) disposed at the inlet (315) of the canister body to selectively open communication between the pump inlet (15) and the inlet (315) of the canister body.

Aspect 9. A toolbox system (360) for replacing a boost pump (304) within a pump canister arrangement of an aircraft fuel system (300), the pump canister arrangement including a pump canister (320) mounted to a pad (322) bounding a fuel tank (302), the pad (322) defining a cavity (350) extending from the fuel tank (302) to an exterior of the pad (322), the toolbox system (360) comprising:
 a toolbox (35) including:
  a toolbox body defining a main chamber (400) having a port (326), the toolbox body being configured to sealingly mount to the pad (322) so that the port (326) aligns with the cavity (350), the main chamber (400) being sized to hold a plurality of pumps (304), the toolbox body having a purge inlet valve (40), a purge outlet valve (39), and a suction valve (38);
  a carrier plate (37) disposed within the main chamber (400) of the toolbox body, the carrier plate (37) being movable within the toolbox body to selectively align first and second sections of the carrier plate (37) with the port (326) of the toolbox body; and
  a rod (44) extending along a length between opposite first and second ends, the first end of the rod (44) being disposed within the main chamber (400), the second end being disposed outside of the toolbox body, the first end of the rod (44) including an engagement structure configured to engage a pump (304), the rod (44) being movable within the main chamber (400) relative to the carrier plate (37).

Aspect 10. The toolbox system of aspect 9, further comprising: a first gas line extending between a gas source (43) and the purge inlet valve (40) of the toolbox body; a recycling line extending between a recycling chamber (364) and the purge outlet valve (39); and a second gas line (410) extending to a purge line (25) of the pump canister arrangement, the purge line (25) being isolated from the first gas line and from the main chamber (400) of the toolbox body.

Aspect 11. The toolbox system of aspect 10, wherein the second gas line (410) extends from a second gas source (42) that holds a different gas than the gas source (43).

Aspect 12. A method for replacing a first boost pump (304) of an aircraft liquid hydrogen fuel system (300) with a second boost pump (304, 36), the method comprising: mounting a toolbox (35) at a fuel tank (302) in which a first boost pump (304) is located so that a port (326) of the toolbox (35) aligns with the first boost pump (304), the toolbox (35) defining a main chamber (400) within which is disposed a carrier plate (37) and a second boost pump (36, 304) seated on the carrier plate (37); removing air from the main chamber (400) by evacuating the air through a suction valve (38) of the toolbox (35); pumping gaseous helium through the main chamber (400) after closing the suction valve (38) to remove any remaining air within the main chamber (400); sealing an interior of the first boost pump (304) from an interior of the fuel tank (302); purging liquid hydrogen from the first boost pump (304) using a gas from a gas source (42) routed through the first boost pump (304); extracting the first boost pump (304) from the fuel tank (302) using an actuation rod (44) within the toolbox (35) and positioning the first boost pump (304) on the carrier plate (37); moving the carrier plate (37) to align the second boost pump (36, 304) with the actuation rod (44); and installing the second boost pump (36, 304) within the fuel tank (302) using the actuation rod (44).

Aspect 13. The method of aspect 12, wherein filling the main chamber (400) with gaseous helium comprises connecting a source (43) of gaseous helium to a purge inlet valve (40) of the toolbox (35) and connecting a recycling chamber (364) to a purge outlet valve (39) of the toolbox (35).

Aspect 14. The method of aspect 12, wherein sealing the interior of the first boost pump (304) from the interior of the fuel tank (302) comprises moving the first boost pump (304) relative to the fuel tank (302) to a purge position to close an inlet (15) of the first boost pump 304), wherein at least a portion of the first boost pump (304) extends into the fuel tank (302) when in the purge position.

Aspect 15. The method of aspect 12, wherein purging liquid hydrogen from the first boost pump (304) comprises connecting a source (42) of the gas to a purge line (25) of a canister (320) in which the first boost pump (304) is disposed; opening a valve of the purge line (25) to introduce the gas from the source (42) into the first boost pump (304); and allowing the gas to flow out of the first boost pump (304) through a purge outlet valve (20) of the first boost pump (304).

Aspect 16. The method of aspect 12, further comprising: disconnecting an electrical connector (8) of the first boost pump (304) from an electrical connector (29) of an aircraft wiring loom prior to sealing the interior of the first boost pump (304); and connecting an electrical connector (8) of the second boost pump (36, 304) to the electrical connector (29) of the aircraft wiring loom after installing the second boost pump within the fuel tank (302).

Aspect 17. The method of aspect 12, further comprising: removing the toolbox (35) from the fuel tank (302) after the second boost pump (36, 304) is installed; mounting a cover plate (340) to extend across a bottom of the second boost pump (36, 304), the cover plate (340) being spaced from a body of the second boost pump (36, 304) to create a cavity (350) in which an electrical connector (8) of the second boost pump (304) is disposed; and purging the cavity (350) with gaseous helium.

Aspect 18. The method of aspect 17, wherein purging the cavity (350) with gaseous helium includes introducing the gaseous helium into the cavity (350) through a connector box purge inlet valve (32) and regulating the gaseous helium within the cavity using the connector box purge inlet valve (32) and a connector box outlet valve (30) that extend through the cover plate (340).

Aspect 19. The method of aspect 12, wherein prior to mounting the toolbox (35) at the fuel tank (302) the method further comprises: removing a cover plate (340) to reveal a cavity (350) leading to the first boost pump (304); and disconnecting an electrical connector (29) of an aircraft wiring loom from an electrical connector (8) of the first boost pump (304) that is disposed within the cavity (350).

Aspect 20. The method of aspect 12, wherein directing gaseous helium through the main chamber (400) after closing the suction valve (38) comprises: connecting a source (43) of the gaseous helium to a purge inlet valve (40) of the toolbox (35); connecting a recycling chamber (364) to a purge outlet valve (39) of the toolbox (35), the recycling chamber (364) having an interior at lower pressure than the source (43) of gaseous helium; and collecting the gaseous helium directed through the main chamber (400) in the recycling chamber (364) for re-use.

Aspect 21. A pump canister (320) comprising: a canister body defining an interior, the canister body defining a longitudinal axis (L) extending between a bottom and a top, the canister body including a peripheral wall (324) extending around the longitudinal axis (L), the peripheral wall (324) defining an inlet (315) at the bottom of the canister body; a discharge line (330) is mounted to the peripheral wall (324) of the canister body at the top of the canister body; and a purge line (25) extends through the peripheral wall (324) of the canister body, the purge line (25) being disposed intermediate the top of the canister body and the bottom of the canister body so that the purge line (25) is spaced from the discharge line (330) along the longitudinal axis.

Aspect 22. The pump canister of aspect 21, further comprising a purge exit valve (20) mounted to the canister body at a location intermediate the top of the canister body and the bottom of the canister body.

Aspect 23. The pump canister of aspect 22, wherein the purge exit valve (20) is disposed opposite the purge line (25).

Aspect 24. The pump canister of any of aspects 21-23, further comprising a pump (304) disposed within the interior of the canister body, the pump (304) including a rotor (10) driven by a shaft (11) relative to a stator (4), the pump (304) defining a pump inlet (15) aligned with the inlet (315) of the canister body, the rotor (10) being aligned with the discharge line (330) and the purge line (25).

Aspect 25. The pump canister of aspect 24, wherein purge exit valve (20) is configured to outlet fuel during low outlet flow conditions of the pump (304) to inhibit low flow cavitation.

Aspect 26. The pump canister of aspect 24, further comprising a slide valve (49) disposed at the inlet (315) of the canister body to selectively open communication between the pump inlet (15) and the inlet (315) of the canister body.

Aspect 27. A fuel system (300) for an aircraft, the fuel system comprising: a fuel tank (302) containing liquid hydrogen; the pump canister (320) of any of claims 1-6 disposed within the fuel tank (302) so that the pump canister (320) is surrounded by the liquid hydrogen so that the purge line (25) of the pump canister (320) outlets liquid hydrogen into the fuel tank (302); and a fuel pump (306) being connected to a discharge valve (330) of the pump canister (320) by a fuel line.

Aspect 28. The fuel system of aspect 27, and preferably of claims 4 and 7, wherein the pump (304) extends along the longitudinal axis between a pump bottom and a pump top, and wherein the pump (304) includes an electrical connector (8) disposed at the bottom of the pump (304).

Aspect 29. The fuel system of aspect 28, wherein the canister body (320) is mounted to a pad (322) that partially bounds the fuel tank (302), wherein the bottom of the canister body (320) aligns with an aperture (350) defined through the pad (322), wherein the electrical connector (8) extends into the aperture (350), and wherein the electrical connector (8) is sealed from the fuel tank.

Aspect 30. The fuel system of aspect 27, and preferably of aspects 24 and 27, wherein the purge exit valve (20) is configured to outlet liquid hydrogen to the fuel tank (302) during a purging operating when removing the pump (304) from the pump canister (320).

Aspect 31. The fuel system of any of aspects 27-30, wherein the pump canister (320) is one of a plurality of pump canisters (320) disposed within the fuel tank (302).

Aspect 32. The fuel system of aspect 31, wherein each of the pump canisters (320) is mounted to a common canister pad (322), and wherein the purge line (25) of each pump canister (320) is routed through the canister pad (322).

Aspect 33. A boost pump (304) for an aircraft fuel system (300), the boost pump (304) comprising: a plurality of modules that assemble together to form the boost pump (304), each of the modules being configured to be independently assembled as a unit prior to assembling the modules together, the plurality of modules including: (a) an upper housing module (110) including: a motor housing (3); a stator (4) disposed within the motor housing (3); an upper insulating sleeve (2) disposed between part of the stator (4) and part of the motor housing (3); a motor coolant discharge flow connector (1); and an upper bearing (9); (b) a rotor module (130) including: a drive shaft (11); a rotor (10) driven by the drive shaft (11); an impeller (7) driven by the drive shaft (11); a lower bearing arrangement surrounding a portion of the drive shaft (11), the lower bearing arrangement including a lower bearing (13) supporting the shaft (11); and (c) a lower housing module (150) including: a lower housing (5) defining an inlet (15) and being configured to mount to a carrier pad (322); a lower insulating sleeve (12) disposed at the lower housing (5); and an electrical connector (8) coupled to the lower housing (5) so that the inlet (15) is disposed between the electrical connector (8) and the lower insulating sleeve (12); wherein the upper and lower housing modules (110, 150) connect together to define a common interior; and wherein the rotor module (130) is enclosed within the common interior.

Aspect 34. The boost pump of aspect 33, wherein the lower housing module (150) also defines a diffuser (14).

Aspect 35. The boost pump of aspect 33, wherein the motor coolant discharge flow connector (1) extend upwardly from the motor housing (3) in axial alignment with the rotor module (130).

Aspect 36. The boost pump of any of aspects 33-35, wherein the boost pump (304) is disassembled by removing one of the upper housing module (110) or the lower housing module (150) as a unit from a remainder of the boost pump (304).

Aspect 37. The boost pump of any of aspects 33-36, wherein the boost pump (304) is configured to be disposed within a fuel tank (302) containing liquid hydrogen.

Aspect 38. An electric motor pump and canister system comprising: a canister pad (322) configured to bound part of a fuel tank (302), the canister pad (322) defining a cavity (350); a canister (320) mounted to the canister pad (322), the canister (320) being positioned to be disposed within the fuel tank (302) when the canister pad (322) is mounted at the fuel tank (302), the canister (320) being mounted so that a bottom opening of the canister (320) aligns with the cavity (350) of the canister pad (322), the canister (320) defining a longitudinal axis extending from a bottom of the canister (320) at the canister pad (322) to a top of the canister (320), the canister (320) including a discharge valve (24); and an electric motor pump (304) disposed within the canister body (320), the electric motor pump (304) extending through the bottom opening of the canister (320) so that part of the electric motor pump (304) extends into the cavity (350) defined by the canister pad (322) to seal part of the cavity from the fuel tank (302), and the electric motor pump (304)

including a demateable electrical connector (8) disposed within the part of the cavity (350) that is sealed from the fuel tank (302).

Aspect 39. The electric motor pump and canister system of aspect 38, wherein the demateable electrical connector (8) is a first demateable electrical connector; and wherein the electric motor pump and canister system further comprises an electrical wiring harness including a second demateable electrical connector (29) that is movably mounted within the cavity (350), and wherein the second demateable electrical connector (29) is configured to mate with the first demateable electrical connector (8) to supply power to the electric motor pump.

Aspect 40. The electric motor pump and canister system of aspect 38 or aspect 39, further comprising: a fuel tank body to which the canister pad (322) mounts to form the fuel tank (302); and liquid hydrogen disposed within the fuel tank (302).

Aspect 41. A toolbox system (360) for replacing a boost pump (304) within a pump canister arrangement of an aircraft fuel system (300), the pump canister arrangement including a pump canister (320) mounted to a pad (322) bounding a fuel tank (302), the pad (322) defining a cavity (350) extending from the fuel tank (302) to an exterior of the pad (322), the toolbox system (360) comprising: a toolbox (35) including: a toolbox body defining a main chamber (400) having a port (326), the toolbox body being configured to sealingly mount to the pad (322) so that the port (326) aligns with the cavity (350), the main chamber (400) being sized to hold a plurality of pumps (304), the toolbox body having a purge inlet valve (40), a purge outlet valve (39), and a suction valve (38); a carrier plate (37) disposed within the main chamber (400) of the toolbox body, the carrier plate (37) being movable within the toolbox body to selectively align first and second sections of the carrier plate (37) with the port (326) of the toolbox body; a rod (44) extending along a length between opposite first and second ends, the first end of the rod (44) being disposed within the main chamber (400), the second end being disposed outside of the toolbox body, the first end of the rod (44) including an engagement structure configured to engage a pump (304), the rod (44) being movable within the main chamber (400) relative to the carrier plate (37).

Aspect 42. The toolbox system of aspect 41, further comprising a first gas line extending between a gas source (43) and the purge inlet valve (40) of the toolbox body.

Aspect 43. The toolbox system of aspect 42, wherein the gas source contains gaseous hydrogen.

Aspect 44. The toolbox system of aspect 42, wherein the gas source contains gaseous helium.

Aspect 45. The toolbox system of any of aspects 41-44, further comprising a recycling line extending between a recycling chamber (364) and the purge outlet valve (39).

Aspect 46. The toolbox system of any of aspects 41-45, further comprising a second gas line (410) extending to a purge line (25) of the pump canister arrangement, the purge line (25) being isolated from the first gas line and from the main chamber (400) of the toolbox body.

Aspect 47. The toolbox system of aspect 46, and preferably of aspects 42 and 46, wherein the second gas line (410) extends from a second gas source (42) that holds a different gas than the gas source (43).

Aspect 48. A method for replacing a first boost pump (304) of an aircraft liquid hydrogen fuel system (300) with a second boost pump (304, 36), the method comprising: mounting a toolbox (35) at a fuel tank (302) in which the first boost pump (304) is located so that a port (326) of the toolbox (35) aligns with the first boost pump (304), the toolbox (35) defining a main chamber (400) within which is disposed a carrier plate (37) and the second boost pump (36, 304) seated on the carrier plate (37); removing air from the main chamber (400) by evacuating the air through a suction valve (38) of the toolbox (35); pumping gaseous helium through the main chamber (400) after closing the suction valve (38) to remove any remaining air within the main chamber (400); sealing an interior of the first boost pump (304) from an interior of the fuel tank (302); purging liquid hydrogen from the first boost pump (304) using a gas from a gas source (42) routed through the first boost pump (304); extracting the first boost pump (304) from the fuel tank (302) using an actuation rod (44) within the toolbox (35) and positioning the first boost pump (304) on the carrier plate (37); moving the carrier plate (37) to align the second boost pump (36, 304) with the actuation rod (44); and installing the second boost pump (36, 304) within the fuel tank (302) using the actuation rod (44).

Aspect 49. The method of aspect 48, wherein evacuating the air through a suction valve (38) also removes air within the second boost pump (36, 304).

Aspect 50. The method of aspect 48 or aspect 49, wherein filling the main chamber (400) with gaseous helium comprises connecting a source (43) of gaseous helium to a purge inlet valve (40) of the toolbox (35) and connecting a recycling chamber (364) to a purge outlet valve (39) of the toolbox (35).

Aspect 51. The method of any of aspects 48-50, wherein sealing the interior of the first boost pump (304) from the interior of the fuel tank (302) comprises moving the first boost pump (304) relative to the fuel tank (302) to a purge position to close an inlet (15) of the first boost pump 304), wherein at least a portion of the first boost pump (304) extends into the fuel tank (302) when in the purge position.

Aspect 52. The method of aspect 51, wherein moving the first boost pump (304) is implemented using the actuation rod (44) disposed within the toolbox (35).

Aspect 53. The method of any of aspects 48-52, wherein purging liquid hydrogen from the first boost pump (304) comprises connecting a source (42) of the gas to a purge line of a canister (320) in which the first boost pump (304) is disposed; opening a valve of the purge line (25) to introduce the gas from the source (42) into the first boost pump (304); and allowing the gas to flow out of the first boost pump (304) through a purge outlet valve (20) of the first boost pump (304).

Aspect 54. The method of any of aspects 48-53, wherein the gas is gaseous hydrogen.

Aspect 55. The method of any of aspects 48-53, wherein the gas is gaseous helium.

Aspect 56. The method of any of aspects 48-55, further comprising: disconnecting an electrical connector (8) of the first boost pump (304) from an electrical connector (29) of an aircraft wiring loom prior to sealing the interior of the first boost pump (304); and connecting an electrical connector (8) of the second boost pump (36, 304) to the electrical connector (29) of the aircraft wiring loom after installing the second boost pump within the fuel tank (302).

Aspect 57. The method of any of aspects 48-56, further comprising: removing the toolbox (35) from the fuel tank (302) after the second boost pump (36, 304) is installed; mounting a cover plate (340) to extend across a bottom of the second boost pump (36, 304), the cover plate (340) being spaced from a body of the second boost pump (36, 304) to create a cavity (350) in which an electrical connector (8) of the second boost pump (304) is disposed; and purging the cavity (350) with gaseous helium.

Aspect 58. The method of aspect 57, wherein purging the cavity (350) with gaseous helium includes introducing the gaseous helium into the cavity (350) through a connector box purge inlet valve (32) and regulating the gaseous helium within the cavity using the connector box purge inlet valve (32) and a connector box outlet valve (30) that extend through the cover plate (340).

Aspect 59. The method of any of aspects 48-58, wherein purging liquid hydrogen from the first boost pump (304) comprises introducing the gas at an intermediate point along a height of the first boost pump (304), wherein the intermediate point is located closer to an impeller (7) of the first boost pump (304) than to a top of the first boost pump (304).

Aspect 60. The method of any of aspects 48-59, wherein prior to mounting the toolbox (35) at the fuel tank (302) the method further comprises: removing a cover plate (340) to reveal a cavity (350) leading to the first boost pump (304); and disconnecting an electrical connector (29) of the aircraft wiring loom from an electrical connector (8) of the first boost pump (304) that is disposed within the cavity (350).

Aspect 61. The method of any of aspects 48-60, wherein directing gaseous helium through the main chamber (400) after closing the suction valve (38) comprises: connecting a source (43) of the gaseous helium to a purge inlet valve (40) of the toolbox (35); connecting a recycling chamber (364) to a purge outlet valve (39) of the toolbox (35), the recycling chamber (364) having an interior at lower pressure than the source (43) of gaseous helium; and collecting the gaseous helium directed through the main chamber (400) in the recycling chamber (364) for re-use.

Aspect 62. Any previous aspect, wherein the boost pump (304) is fully flooded with liquid hydrogen during normal operation.

Aspect 63. The pump canister of any of aspects 21-23, wherein the purge line (25) extends through the peripheral wall (324) at a middle third of the peripheral wall (324).

Aspect 64. The electric motor pump and canister system of aspect 38, wherein the electrical connector (8) is hermetically sealed from the fuel tank (302).

In accordance with principles of this disclosure, materials of construction for the systems and components as described herein include materials that are compatible with the environment, materials to be contained, cleaning and sanitizing considerations, and use and performance of the systems.

For the purposes of this application, the depicted axes, along with terms such as "upper," "lower," "front," "rear," "upward," "downward" "frontward," and "rearward" are intended to be descriptive with reference to and in relation to the orientation shown in the Figures for clarity, but the examples as practiced and included in the scope of the claims may include examples where the systems and devices are in a different orientation.

While particular uses of the technology have been illustrated and discussed above, the disclosed technology can be used with a variety of environments in accordance with many examples of the technology. The above discussion is not meant to suggest that the disclosed technology is only suitable for implementation within the environments shown and described above.

This disclosure described some aspects of the present technology with reference to the accompanying drawings, in which only some of the possible aspects were shown. Other aspects can, however, be embodied in many different forms and should not be construed as limited to the aspects set forth herein. Rather, these aspects were provided so that this disclosure was thorough and complete and fully conveyed the scope of the possible aspects to those skilled in the art. As should be appreciated, the various aspects described with respect to the figures herein are not intended to limit the technology to the particular aspects described. Accordingly, additional configurations can be used to practice the technology herein and/or some aspects described can be excluded without departing from the methods and systems disclosed herein.

Similarly, where operations of a process or method are disclosed, those operations are described for purposes of illustrating the present technology and are not intended to limit the disclosure to a particular sequence of operations. For example, the operations can be performed in differing order, two or more operations can be performed concurrently, additional operations can be performed, and disclosed operations can be excluded without departing from the present disclosure. Further, each operation can be accomplished via one or more sub-operations. The disclosed processes can be repeated.

Although specific aspects were described herein, the scope of the technology is not limited to those specific aspects. One skilled in the art will recognize other aspects or improvements that are within the scope of the present technology. Therefore, the specific structure, acts, or operations are disclosed only as illustrative aspects. The scope of the technology is defined by the following claims and any equivalents therein.

What is claimed is:

1. An electric motor pump and canister system comprising:
   a canister pad configured to bound part of a fuel tank, the canister pad defining a cavity;
   a canister mounted to the canister pad, the canister being positioned to be disposed within the fuel tank when the canister pad is mounted at the fuel tank, the canister being mounted so that a bottom opening of the canister aligns with the cavity of the canister pad, the canister defining a longitudinal axis extending from a bottom of the canister at the canister pad to a top of the canister, the canister including a discharge valve, wherein the canister comprises:
   a canister body defining an interior, the canister body including a peripheral wall extending around the longitudinal axis, and
   a purge line extending through the peripheral wall of the canister body; and
   an electric motor pump disposed within the canister, the electric motor pump extending through the bottom opening of the canister so that part of the electric motor pump extends into the cavity defined by the canister pad to seal part of the cavity from the fuel tank, and the electric motor pump including a demateable electrical connector disposed within the part of the cavity that is sealed from the fuel tank.

2. The electric motor pump and canister system of claim 1, wherein the demateable electrical connector is a first demateable electrical connector; and wherein the electric motor pump and canister system further comprises an electrical wiring harness including a second demateable electrical connector that is movably mounted within the cavity, and wherein the second demateable electrical connector is configured to mate with the first demateable electrical connector to supply power to the electric motor pump.

3. The electric motor pump and canister system of claim 1, further comprising:
   a fuel tank body to which the canister pad mounts to form the fuel tank; and
   liquid hydrogen disposed within the fuel tank.

4. The electric motor pump and canister system of claim 1, wherein
   the peripheral wall defines an inlet at a bottom of the canister body,
   the canister further comprises a discharge line mounted to the peripheral wall of the canister body at a top of the canister body, and
   the purge line is disposed intermediate the top of the canister body and the bottom of the canister body so that the purge line is spaced from the discharge line along the longitudinal axis.

5. The electric motor pump and canister of claim 1, further comprising a purge exit valve mounted to the canister body at a location intermediate a top of the canister body and a bottom of the canister body.

6. The electric motor pump and canister of claim 4, wherein the electric motor pump is disposed within the interior of the canister body, the pump defining a pump inlet aligned with the inlet of the canister body, a rotor being aligned with the discharge line and the purge line.

7. The electric motor pump and canister of claim 6, wherein the electric motor pump further comprises:
   a plurality of modules that assemble together to form the electric motor pump, each of the modules being configured to be independently assembled as a unit prior to assembling the modules together, the plurality of modules including:
   (a) an upper housing module including:
      a motor housing;
      a stator disposed within the motor housing;
      an upper insulating sleeve disposed between part of the stator and part of the motor housing;
      a motor coolant discharge flow connector; and
      an upper bearing;
   (b) a rotor module including:
      a drive shaft;
      a rotor driven by the drive shaft;
      an impeller driven by the drive shaft; and
      a lower bearing arrangement surrounding a portion of the drive shaft, the lower bearing arrangement including a lower bearing supporting the shaft; and
   (c) a lower housing module including:
      a lower housing defining the inlet and being configured to mount to the canister pad;
      a lower insulating sleeve disposed at the lower housing; and
      the demateable electrical connector coupled to the lower housing so that the inlet is disposed between the demateable electrical connector and the lower insulating sleeve;
   wherein the upper and lower housing modules connect together to define a common interior; and wherein the rotor module is enclosed within the common interior.

8. The electric motor pump and canister of claim 6, further comprising a slide valve disposed at the inlet of the canister body to selectively open communication between the pump inlet and the inlet of the canister body.

* * * * *